United States Patent
Ozawa et al.

(10) Patent No.: US 11,936,078 B2
(45) Date of Patent: Mar. 19, 2024

(54) FUEL CELL SYSTEM AND METHOD FOR STARTING SAME

(71) Applicant: MITSUBISHI HEAVY INDUSTRIES, LTD., Tokyo (JP)

(72) Inventors: Hiroyuki Ozawa, Kanagawa (JP); Yasushi Iwai, Tokyo (JP); Kimi Kodo, Kanagawa (JP); Kenta Araki, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 30 days.

(21) Appl. No.: 17/634,658

(22) PCT Filed: Jan. 27, 2021

(86) PCT No.: PCT/JP2021/002845
§ 371 (c)(1),
(2) Date: Feb. 11, 2022

(87) PCT Pub. No.: WO2021/171883
PCT Pub. Date: Sep. 2, 2021

(65) Prior Publication Data
US 2022/0416273 A1    Dec. 29, 2022

(30) Foreign Application Priority Data
Feb. 27, 2020    (JP) .................. 2020-032260

(51) Int. Cl.
*H01M 8/04*         (2016.01)
*H01M 8/04111*     (2016.01)
(Continued)

(52) U.S. Cl.
CPC .... *H01M 8/04225* (2016.02); *H01M 8/04111* (2013.01); *H01M 8/04302* (2016.02);
(Continued)

(58) Field of Classification Search
CPC ......... H01M 8/04225; H01M 8/04302; H01M 8/04111; H01M 8/0432; H01M 8/04746; H01M 8/12
See application file for complete search history.

(56) References Cited

U.S. PATENT DOCUMENTS

2015/0285141 A1* 10/2015 Manabe .................... F02C 6/10
                                                             60/774
2015/0285191 A1* 10/2015 Kitada .................... F02B 37/18
                                                             60/605.2
2015/0295256 A1* 10/2015 Nakamoto ........ H01M 8/04225
                                                             429/429

FOREIGN PATENT DOCUMENTS

JP        8-190924 A     7/1996
JP     2000-348749 A    12/2000
(Continued)

OTHER PUBLICATIONS

International Search Report dated Apr. 20, 2021, issued in counterpart International Application No. PCT/JP2021/002845, w/English translation (5 pages).
(Continued)

*Primary Examiner* — Olatunji A Godo
(74) *Attorney, Agent, or Firm* — WHDA, LLP

(57) ABSTRACT

The purpose of the present invention is to provide fuel cell system capable of stable start-up and method for starting the fuel cell system. Fuel cell system includes SOFC, a turbocharger, oxidizing gas supply line, a control valve, oxidizing gas blow line, start-up air line for supplying the start-up air to the oxidizing gas supply line with a blower, and a control unit that, in state in which the control valve is closed and the blow valve is opened to supply the start-up air to the oxidizing gas supply line with the blower when the turbocharger is started, decreases the opening of the blow valve and, after the timing at which the opening of the blow valve
(Continued)

starts to decrease, increases the opening of the control valve and then stops the supply of the starting air.

14 Claims, 18 Drawing Sheets

(51) Int. Cl.
*H01M 8/04225* (2016.01)
*H01M 8/04302* (2016.01)
*H01M 8/0432* (2016.01)
*H01M 8/04746* (2016.01)
*H01M 8/12* (2016.01)

(52) U.S. Cl.
CPC ..... *H01M 8/0432* (2013.01); *H01M 8/04746* (2013.01); *H01M 8/12* (2013.01); *H01M 2008/1293* (2013.01)

(56) References Cited

FOREIGN PATENT DOCUMENTS

JP 2018-6004 A 1/2018
JP 6591112 B1 10/2019

OTHER PUBLICATIONS

Notice of Reasons for Refusal dated Apr. 13, 2021, issued in counterpart JP Patent Application No. 2020-032260, w/ English translation (7 pages).

\* cited by examiner

FUEL CELL SYSTEM AND METHOD FOR STARTING SAME

TECHNICAL FIELD

The present disclosure relates to fuel cell system and method for starting the same.

BACKGROUND ART

Fuel cell that generates power by chemically reacting fuel gas with oxidizing gas has characteristics such as excellent power generation efficiency and environmental friendliness. Among fuel cells, solid oxide fuel cell (hereinafter, referred to as SOFC) generates power by using ceramics such as zirconia ceramics as an electrolyte, supplying hydrogen, town gas, natural gas, petroleum, methanol, and gas such as gasified gas produced from carbonaceous raw materials by a gasification facility, as fuel gas, and reacting in high temperature atmosphere of approximately 700° C. to 1000° C. (For example, PTL 1 and PTL 2)

CITATION LIST

Patent Literature

[PTL 1] Japanese Unexamined Patent Application Publication No. 2018-6004
[PTL 2] Japanese Patent No. 6591112

SUMMARY OF INVENTION

Technical Problem

As the SOFC, ceramics such as zirconia ceramics are used as the electrolyte, and the SOFC reacts in high temperature atmosphere of approximately 700° C. to 1000° C. to efficiently generate power. In system that combines SOFC and a turbocharger, the turbocharger cannot be started independently unlike a micro gas turbine, for example. Therefore, start-up gas is supplied from the outside. Thus, at the time of start-up, it is necessary to switch between the start-up gas and the gas compressed by the compressor of the turbocharger. However, in case of switching, there is possibility that the gas flows backward depending on the pressure state. Therefore, start-up method for properly switching between the start-up gas and the gas compressed by the turbocharger is necessary, so that the start-up is stably performed.

The present disclosure has been made in view of such circumstances, and the object of thereof is to provide fuel cell system capable of performing stable start-up and method for starting the same.

Solution to Problem

According to first aspect of the present disclosure, there is provided fuel cell system including: fuel cell having cathode (air electrode) and anode (fuel electrode); a turbocharger having a turbine to which exhaust fuel gas and exhaust oxidizing gas discharged from the fuel cell are supplied as combustion gas and having a compressor driven by the turbine; oxidizing gas supply line for supplying oxidizing gas compressed by the compressor to the cathode; a control valve provided in the oxidizing gas supply line; blow line having one end connected to upstream side of the control valve in the oxidizing gas supply line and discharging the oxidizing gas to outside of the system with a blow valve; start-up air line having one end connected to downstream side of the control valve in the oxidizing gas supply line and supplying start-up air to the oxidizing gas supply line with a blower; and a control unit that decreases opening of the blow valve, increases opening of the control valve after the opening of the blow valve starts to be decreased, and then stops the supply of the start-up air in state where the control valve is closed and the blow valve is opened to supply the start-up air to the oxidizing gas supply line with the blower in case where start-up of the turbocharger is performed.

According to second aspect of the present disclosure, there is provided method for starting fuel cell system including fuel cell having cathode and anode, a turbocharger having a turbine to which exhaust fuel gas and exhaust oxidizing gas discharged from the fuel cell are supplied as combustion gas and having a compressor driven by the turbine, oxidizing gas supply line for supplying oxidizing gas compressed by the compressor to the cathode, a control valve provided in the oxidizing gas supply line, blow line having one end connected to upstream side of the control valve in the oxidizing gas supply line and discharging the oxidizing gas to outside of the system with a blow valve, and start-up air line having one end connected to downstream side of the control valve in the oxidizing gas supply line and supplying start-up air to the oxidizing gas supply line with a blower, the method including: decreasing opening of the blow valve, increasing opening of the control valve after a timing at which the opening of the blow valve starts to be decreased, and then stopping the supply of the start-up air in state where the control valve is closed and the blow valve is opened to supply the start-up air to the oxidizing gas supply line with the blower in case where start-up is performed.

Advantageous Effects of Invention

According to the present disclosure, there is an effect that the start-up can be performed more stably.

DESCRIPTION OF EMBODIMENTS

First Embodiment

Hereinafter, first embodiment of fuel cell system and method for starting the same according to the present disclosure will be described with reference to the drawings.

In the following, for convenience of description, the positional relationship between each of the configuration elements described using the expressions "up" and "down" on the paper surface indicates perpendicularly upper side and perpendicularly lower side, respectively, and perpendicular direction is not exact and includes uncertainty. In the present embodiment, regarding up-down direction and horizontal direction which can obtain the same effect, for example, the up-down direction on the paper surface is not necessarily limited to the perpendicularly up-down direction, and the direction may correspond to the horizontal direction orthogonal to the perpendicular direction.

Hereinafter, although a cylindrical (tubular) cell stack will be described as an example of a cell stack of solid oxide fuel cell (SOFC), the cell stack is not necessarily limited thereto, and may be, for example, a flat cell stack. The fuel cell is formed on a substrate, but electrode (anode (fuel electrode) 109 or cathode (air electrode) 113) may be formed thick without the substrate, and may also serve as the support part.

Figure 1:
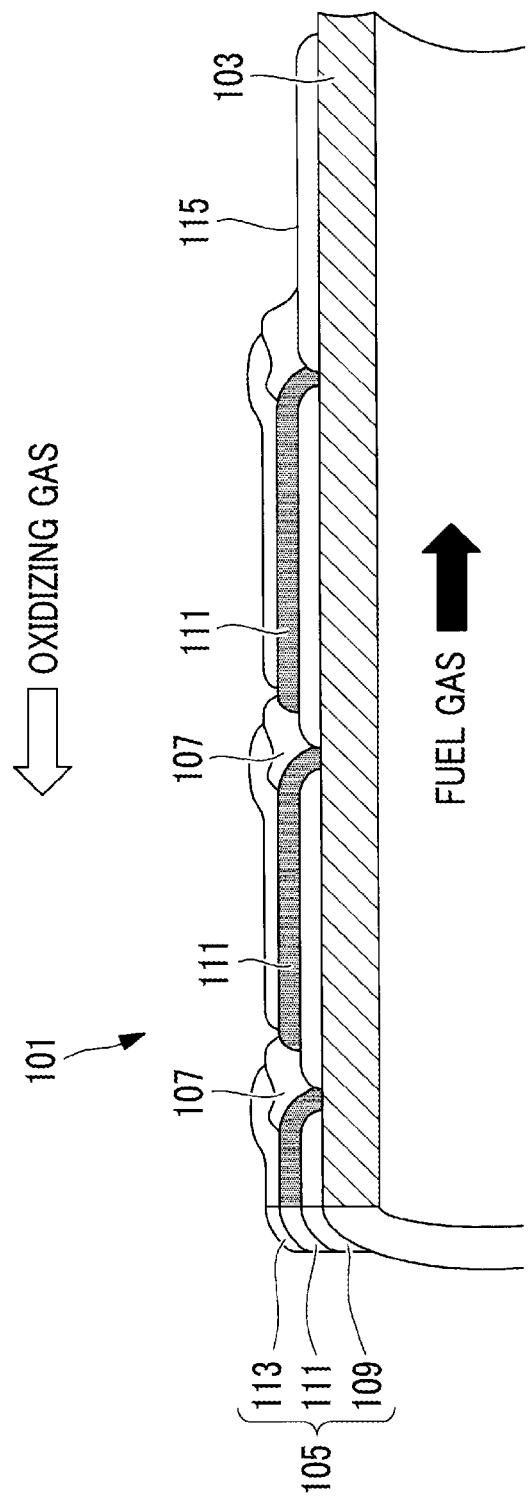
FIG. 1 shows example of a cell stack according to first embodiment of the present disclosure.

First, a cylindrical cell stack using a substrate tube will be described as example according to the present embodiment with reference to FIG. 1. When the substrate tube is not used, for example, the anode 109 may be formed thick and may also be used as the substrate tube, and the use of the substrate tube is not limited. The substrate tube in the present embodiment will be described using cylindrical shape, but the substrate tube may be tubular, and the cross section thereof is not necessarily limited to circular shape, and may be, for example, elliptical shape. A cell stack having flat tubular shape or the like in which peripheral side surface of the cylinder is vertically transposed may be used. Here, FIG. 1 illustrates the aspect of the cell stack according to the present embodiment. A cell stack 101 includes, for example, a cylindrical substrate tube 103, plurality of fuel cells 105 formed on an outer peripheral surface of the substrate tube 103, and an interconnector 107 formed between the fuel cells 105 adjacent to each other. The fuel cell 105 is formed by laminating anode 109, solid electrolyte film 111, and cathode 113. The cell stack 101 includes lead film 115 electrically connected via the interconnector 107 to the cathode 113 of the fuel cell 105 formed at one end at the endmost part of the substrate tube 103 in axial direction, and lead film 115 electrically connected to the anode 109 of the fuel cell 105 formed at the other end at the endmost part, in the plurality of fuel cells 105 formed on the outer peripheral surface of the substrate tube 103.

The substrate tube 103 is made of porous material, for example, CaO stabilized $ZrO_2$ (CSZ), a mixture of CSZ and nickel oxide (NiO), $Y_2O_3$ stabilized $ZrO_2$ (YSZ), $MgAl_2O_4$, or the like as main components. The substrate tube 103 supports the fuel cell 105, the interconnector 107, and the lead film 115, and diffuses the fuel gas supplied to the inner peripheral surface of the substrate tube 103 to the anode 109 formed on the outer peripheral surface of the substrate tube 103 through pores of the substrate tube 103.

The anode 109 is made of an oxide of composite material of Ni and zirconia-based electrolyte material, and, for example, Ni/YSZ is used. The thickness of the anode 109 is 50 μm to 250 μm, and the anode 109 may be formed by screen-printing slurry. In this case, the anode 109 has Ni which is a component of the anode 109 and which has a catalytic action on the fuel gas. The catalytic reaction is performed for the fuel gas, for example, mixed gas of methane ($CH_4$) and steam, supplied through the substrate tube 103, and reformed to hydrogen ($H_2$) and carbon monoxide (CO). The anode 109 electrochemically reacts reformed gas which obtains hydrogen ($H_2$) and carbon monoxide (CO) with oxygen ions ($O^{2-}$) supplied through the solid electrolyte film 111, in the vicinity of interface with the solid electrolyte film 111, and generates water ($H_2O$) and carbon dioxide ($CO_2$). At this time, the fuel cell 105 generates power via electrons released from oxygen ions.

Examples of the fuel gas that can be supplied to the anode 109 of the solid oxide fuel cell and used, include gasified gas produced by gasification facility from carbonaceous raw material such as petroleum, methanol, and coal, in addition to hydrogen ($H_2$), carbon monoxide (CO), and hydrocarbon gas such as methane ($CH_4$), town gas, and natural gas.

As the solid electrolyte film 111, YSZ having airtightness that makes it difficult for gas to pass and high oxygen ionic conductivity at high temperature is mainly used. The solid electrolyte film 111 transfers oxygen ions ($O^{2-}$) generated at the cathode 113 to the anode 109. The film thickness of the solid electrolyte film 111 positioned on the surface of the anode 109 is 10 μm to 100 μm, and the solid electrolyte film 111 may be formed by screen-printing slurry.

The cathode 113 is made of, for example, a $LaSrMnO_3$-based oxide or a $LaCoO_3$-based oxide, and the cathode 113 is coated with slurry by screen-printing or using a dispenser. The cathode 113 dissociates oxygen in the oxidizing gas such as air to be supplied in the vicinity of the interface with the solid electrolyte film 111 and generates oxygen ions ($O^{2-}$).

The cathode 113 can also have a two-layer configuration. In this case, the cathode layer (cathode intermediate layer) on the solid electrolyte film 111 side is made of material having high ionic conductivity and excellent catalytic activity. The cathode layer (cathode conductive layer) on the cathode intermediate layer may be made of a perovskite type oxide represented by Sr and Ca-doped $LaMnO_3$. In this way, it is possible to further improve the power generation performance.

The oxidizing gas is gas containing approximately 15% to 30% oxygen, and representatively, air is suitable. However, in addition to air, mixed gas of combustion exhaust gas and air, mixed gas of oxygen and air, and the like can be used.

The interconnector 107 is made of a conductive perovskite type oxide represented by $M_{1-x}L_xTiO_3$ (M is alkaline earth metal element and L is lanthanoid element) such as $SrTiO_3$, and is formed by screen-printing slurry. The interconnector 107 is dense film such that the fuel gas and the oxidizing gas do not mix with each other. The interconnector 107 has stable durability and electric conductivity under both oxidizing atmosphere and reducing atmosphere. The interconnector 107 electrically connects the cathode 113 of one fuel cell 105 and the anode 109 of the other fuel cell 105 in the fuel cells 105 adjacent to each other, and connects the fuel cells 105 adjacent to each other in series.

Since the lead film 115 needs to have electron conductivity and to have a similar thermal expansion coefficient to that of other materials constituting the cell stack 101, the lead film 115 is made of composite material of Ni and zirconia-based electrolyte material such as Ni/YSZ or $M_{1-x}L_xTiO_3$ (M is alkaline earth metal element and L is lanthanoid element) such as $SrTiO_3$. The lead film 115 conducts DC power generated by the plurality of fuel cells 105 connected to each other in series by the interconnector 107, to the vicinity of end portion of the cell stack 101.

The substrate tube 103 on which the slurry film of the anode 109, the solid electrolyte film 111, and the interconnector 107 is formed is co-sintered in the atmosphere. The sintering temperature is specifically set at 1350° C. to 1450° C.

Next, the substrate tube 103 on which the slurry film of the cathode 113 is formed is sintered in the atmosphere on the co-sintered substrate tube 103. The sintering temperature is specifically set at 1100° C. to 1250° C. The sintering temperature here is lower than the co-sintering temperature after forming the substrate tube 103 to the interconnector 107.

Figure 2:
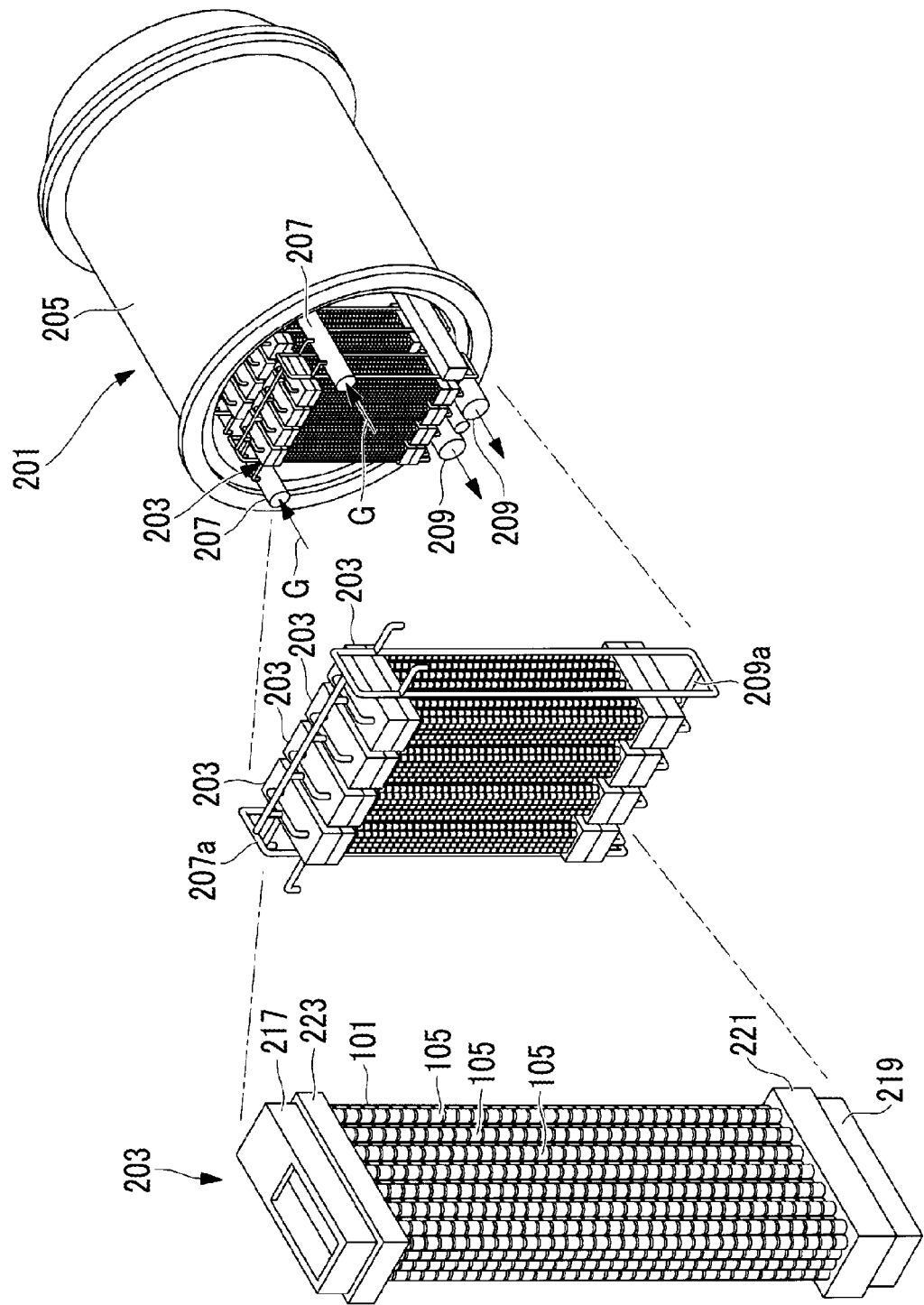
FIG. 2 shows example of an SOFC module according to the first embodiment of the present disclosure.
Figure 3:
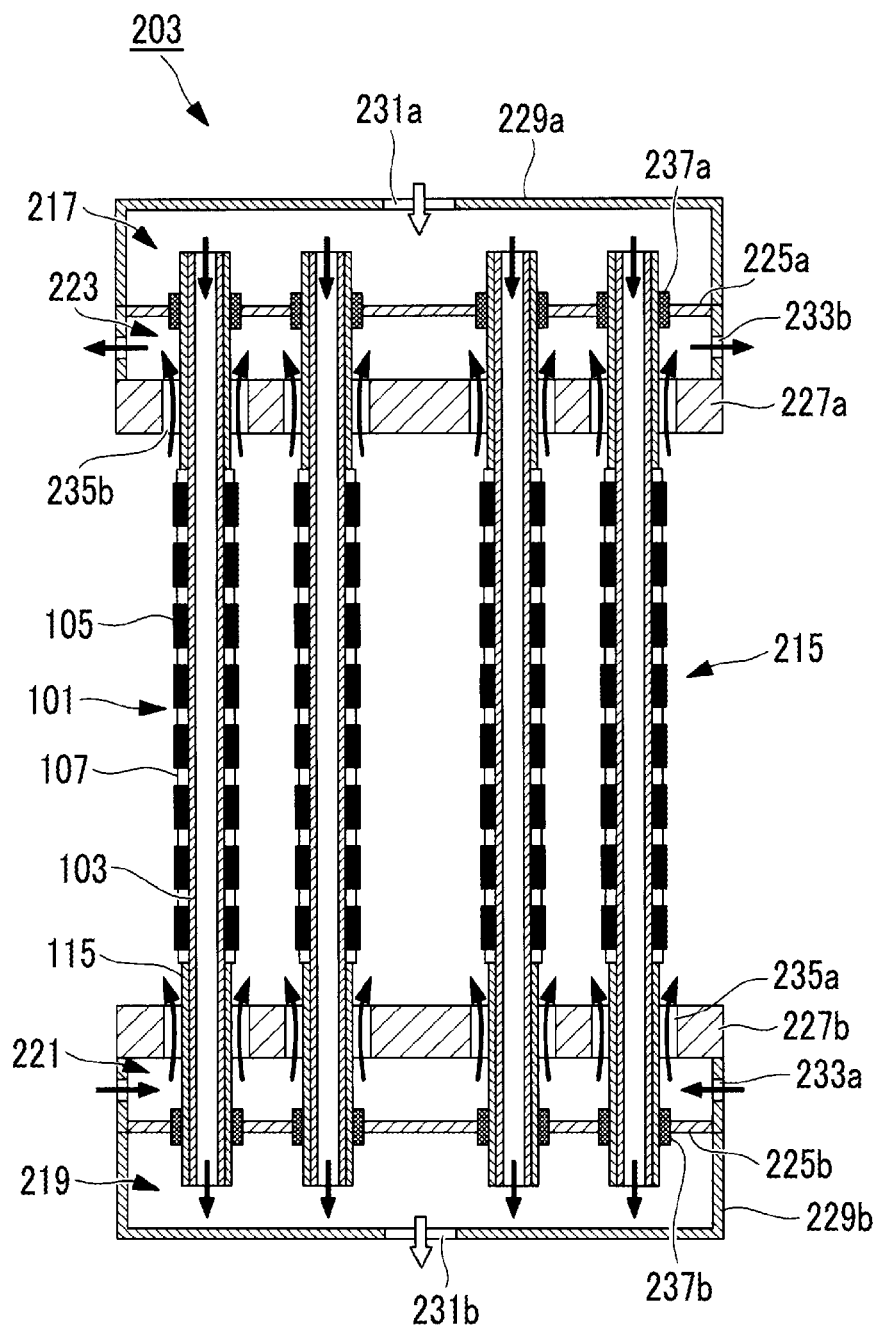
FIG. 3 shows example of an SOFC cartridge according to the first embodiment of the present disclosure.

Next, an SOFC module and an SOFC cartridge according to the present embodiment will be described with reference to FIGS. 2 and 3. Here, FIG. 2 illustrates aspect of the SOFC module according to the present embodiment. FIG. 3 illustrates a sectional view of aspect of the SOFC cartridge according to the present embodiment.

As illustrated in FIG. 2, an SOFC module (fuel cell module) 201 includes, for example, a plurality of SOFC cartridges 203 (fuel cell cartridges) and a pressure vessel 205 that stores the plurality of SOFC cartridges 203 therein. Although a cylindrical SOFC cell stack 101 is described as example in FIG. 2, the cell stack is not limited thereto, and may be, for example, a flat cell stack. The SOFC module 201 includes a fuel gas supply pipe 207, a plurality of fuel gas supply branch pipes 207a, a fuel gas discharge pipe 209, and a plurality of fuel gas discharge branch pipes 209a. The SOFC module 201 includes an oxidizing gas supply pipe (not illustrated), an oxidizing gas supply branch pipe (not illustrated), an oxidizing gas discharge pipe (not illustrated), and a plurality of oxidizing gas discharge branch pipes (not illustrated).

The fuel gas supply pipe 207 is provided on the outside of the pressure vessel 205, connected to a fuel gas supply unit for supplying fuel gas having a predetermined gas composition and predetermined flow rate in accordance with the power generation amount of the SOFC module 201, and connected to the plurality of fuel gas supply branch pipes 207a. The fuel gas supply pipe 207 branches the predetermined flow rate of fuel gas supplied from the above-described fuel gas supply unit to the plurality of fuel gas supply branch pipes 207a, and guides the fuel gas. The fuel gas supply branch pipe 207a is connected to the fuel gas supply pipe 207 and is connected to the plurality of SOFC cartridges 203. The fuel gas supply branch pipe 207a guides the fuel gas supplied from the fuel gas supply pipe 207 to the plurality of SOFC cartridges 203 at substantially uniform flow rate, and makes the power generation performance of the plurality of SOFC cartridges 203 substantially uniform.

The fuel gas discharge branch pipe 209a is connected to the plurality of SOFC cartridges 203 and to the fuel gas discharge pipe 209. The fuel gas discharge branch pipe 209a guides the exhaust fuel gas discharged from the SOFC cartridge 203 to the fuel gas discharge pipe 209. The fuel gas discharge pipe 209 is connected to the plurality of fuel gas discharge branch pipes 209a, and a part thereof is disposed on the outside of the pressure vessel 205. The fuel gas discharge pipe 209 guides the exhaust fuel gas derived from the fuel gas discharge branch pipe 209a at a substantially equal flow rate to the outside of the pressure vessel 205.

Since the pressure vessel 205 is operated at internal pressure of 0.1 MPa to approximately 3 MPa and at internal temperature of the atmospheric temperature to approximately 550° C., material that maintains pressure tolerance and corrosion resistance with respect to oxygen containing gas, such as oxygen contained in the oxidizing gas, is used. For example, stainless steel material such as SUS304 is suitable.

Here, in the present embodiment, aspect in which the plurality of SOFC cartridges 203 are assembled and stored in the pressure vessel 205 is described, but the present invention is not limited thereto, and aspect in which the SOFC cartridges 203 are not assembled and stored in the pressure vessel 205 can also be employed.

As illustrated in FIG. 3, the SOFC cartridge 203 includes a plurality of cell stacks 101, a power generation chamber 215, a fuel gas supply header 217, a fuel gas discharge header 219, an oxidizing gas (air) supply header 221, and an oxidizing gas discharge header 223. The SOFC cartridge 203 includes an upper tube plate 225a, a lower tube plate 225b, an upper thermal insulation 227a, and a lower thermal insulation 227b. In the present embodiment, the SOFC cartridge 203 has a structure in which the fuel gas supply header 217, the fuel gas discharge header 219, the oxidizing gas supply header 221, and the oxidizing gas discharge header 223 are arranged as illustrated in FIG. 3 such that the fuel gas and the oxidizing gas flow while facing the inner side and the outer side of the cell stack 101, but this structure is not necessary, and, for example, the gas may flow while being parallel to the inner side and the outer side of the cell stack 101, and the oxidizing gas may flow in a cross flow to an axial direction of the cell stack 101.

The power generation chamber 215 is a region formed between the upper thermal insulation 227a and the lower thermal insulation 227b. The power generation chamber 215 is a region where the fuel cells 105 of the cell stack 101 are arranged, and is a region where power is generated by electrochemically reacting the fuel gas and the oxidizing gas. The temperature in the vicinity of center portion of the power generation chamber 215 in the longitudinal direction of the cell stack 101 is monitored by a temperature measurement unit (temperature sensor, thermocouple, or the like), and high temperature atmosphere of approximately 700° C. to 1000° C. is achieved during the steady operation of the SOFC module 201.

The fuel gas supply header 217 is a region surrounded by an upper casing 229a and an upper tube plate 225a of the SOFC cartridge 203, and is connected to the fuel gas supply branch pipe 207a through a fuel gas supply hole 231a provided in upper portion of the upper casing 229a. The plurality of cell stacks 101 are joined to the upper tube plate 225a by a seal member 237a, and the fuel gas supply header 217 guides the fuel gas supplied from the fuel gas supply branch pipe 207a through the fuel gas supply hole 231a at substantially uniform flow rate on the inside of the substrate tube 103 of the plurality of cell stacks 101, and makes the power generation performance of the plurality of cell stacks 101 substantially uniform.

The fuel gas discharge header 219 is a region surrounded by a lower casing 229b and the lower tube plate 225b of the SOFC cartridge 203, and is connected to the fuel gas discharge branch pipe 209a (not illustrated) through a fuel gas discharging hole 231b provided in the lower casing 229b. The plurality of cell stacks 101 are joined to the lower tube plate 225b by a seal member 237b, and the fuel gas discharge header 219 collects the exhaust fuel gas that passes through the inside of the substrate tube 103 of the plurality of cell stacks 101 and that is supplied to the fuel gas discharge header 219, and guides the exhaust fuel gas to the fuel gas discharge branch pipe 209a through the fuel gas discharging hole 231b.

Oxidizing gas having predetermined gas composition and predetermined flow rate is branched into the oxidizing gas supply branch pipe in accordance with the power generation amount of the SOFC module 201 and is supplied to a plurality of SOFC cartridges 203. The oxidizing gas supply header 221 is a region surrounded by the lower casing 229b, the lower tube plate 225b, and the lower thermal insulation 227b of the SOFC cartridge 203, and is connected to the oxidizing gas supply branch pipe (not illustrated) through an oxidizing gas supply hole 233a provided on side surface of the lower casing 229b. The oxidizing gas supply header 221 guides predetermined flow rate of oxidizing gas supplied from the oxidizing gas supply branch pipe (not illustrated) through the oxidizing gas supply hole 233a, to the power generation chamber 215 through an oxidizing gas supply gap 235a which will be described later.

The oxidizing gas discharge header 223 is a region surrounded by the upper casing 229a, the upper tube plate 225a, and the upper thermal insulation 227a of the SOFC cartridge 203, and is connected to an oxidizing gas discharge branch pipe (not illustrated) through an oxidizing gas discharging hole 233b provided on the side surface of the upper casing 229a. The oxidizing gas discharge header 223 guides the exhaust oxidizing gas supplied from the power generation chamber 215 to the oxidizing gas discharge header 223 through an oxidizing gas discharge gap 235b which will be described later, to the oxidizing gas discharge branch pipe (not illustrated) through the oxidizing gas discharging hole 233b.

The upper tube plate 225a is fixed to the side plate of the upper casing 229a such that the upper tube plate 225a, the top plate of the upper casing 229a, and the upper thermal insulation 227a are substantially parallel to each other, between the top plate of the upper casing 229a and the upper thermal insulation 227a. The upper tube plate 225a has a plurality of holes corresponding to the number of cell stacks 101 provided in the SOFC cartridge 203, and the cell stacks 101 are respectively inserted into the holes. The upper tube plate 225a airtightly supports one end portion of the plurality of cell stacks 101 via one or both of the seal member 237a and an adhesive member, and further isolates the fuel gas supply header 217 and the oxidizing gas discharge header 223 from each other.

The upper thermal insulation 227a is disposed at lower end portion of the upper casing 229a such that the upper thermal insulation 227a, the top plate of the upper casing 229a, and the upper tube plate 225a are substantially parallel to each other, and is fixed to the side plate of the upper casing 229a. The upper thermal insulation 227a has a plurality of holes corresponding to the number of cell stacks 101 provided in the SOFC cartridge 203. The diameter of the hole is set to be higher than the outer diameter of the cell stack 101. The upper thermal insulation 227a includes an oxidizing gas discharge gap 235b formed between the inner surface of the hole and the outer surface of the cell stack 101 inserted into the upper thermal insulation 227a.

The upper thermal insulation 227a separates the power generation chamber 215 and the oxidizing gas discharge header 223 from each other, the temperature increase of the atmosphere around the upper tube plate 225a, which causes the strength deterioration or increase in corrosion due to the oxygen containing gas contained in the oxidizing gas, is suppressed. The upper tube plate 225a and the like are made of high temperature durable metallic material such as Inconel to prevent thermal deformation since the upper tube plate 225a and the like are exposed to the high temperature in the power generation chamber 215, and the temperature difference in the upper tube plate 225a and the like increases. The upper thermal insulation 227a guides the exhaust oxidizing gas that has passed through the power generation chamber 215 and that has been exposed to the high temperature, to the oxidizing gas discharge header 223 through the oxidizing gas discharge gap 235b.

According to the present embodiment, due to the structure of the above-described SOFC cartridge 203, the fuel gas and the oxidizing gas flow while facing the inner side and the outer side of the cell stack 101. Accordingly, the exhaust oxidizing gas exchanges heat with the fuel gas supplied to the power generation chamber 215 through the inside of the substrate tube 103, is cooled to temperature at which deformation such as buckling of the upper tube plate 225a and the like made of metallic material does not occur, and is supplied to the oxidizing gas discharge header 223. The temperature of the fuel gas increases via the heat exchange with the exhaust oxidizing gas discharged from the power generation chamber 215, and the fuel gas is supplied to the power generation chamber 215. As a result, it is possible to supply the fuel gas preheated to temperature suitable for power generation without using a heater or the like, to the power generation chamber 215.

The lower tube plate 225b is fixed to the side plate of the lower casing 229b such that the lower tube plate 225b, the bottom plate of the lower casing 229b, and the lower thermal insulation 227b are substantially parallel to each other, between the bottom plate of the lower casing 229b and the lower thermal insulation 227b. The lower tube plate 225b has a plurality of holes corresponding to the number of cell stacks 101 provided in the SOFC cartridge 203, and the cell stacks 101 are respectively inserted into the holes. The lower tube plate 225b airtightly supports the other end portion of the plurality of cell stacks 101 via one or both of the seal member 237b and an adhesive member, and further isolates the fuel gas discharge header 219 and the oxidizing gas supply header 221 from each other.

The lower thermal insulation 227b is disposed at upper end portion of the lower casing 229b such that the lower thermal insulation 227b, the bottom plate of the lower casing 229b, and the lower tube plate 225b are substantially parallel to each other, and is fixed to the side plate of the lower casing 229b. The lower thermal insulation 227b has a plurality of holes corresponding to the number of cell stacks 101 provided in the SOFC cartridge 203. The diameter of the hole is set to be higher than the outer diameter of the cell stack 101. The lower thermal insulation 227b includes the oxidizing gas supply gap 235a formed between the inner surface of the hole and the outer surface of the cell stack 101 inserted into the lower thermal insulation 227b.

The lower thermal insulation 227b separates the power generation chamber 215 and the oxidizing gas supply header 221 from each other, the temperature of the atmosphere around the lower tube plate 225b increases, and the strength deterioration or increase in corrosion due to the oxygen containing gas contained in the oxidizing gas is suppressed. The lower tube plate 225b and the like are made of high temperature durable metallic material such as Inconel, but thermal deformation is prevented since the lower tube plate 225b and the like are exposed to the high temperature, and the temperature difference in the lower tube plate 225b and the like increases. The lower thermal insulation 227b guides the oxidizing gas supplied to the oxidizing gas supply header 221 to the power generation chamber 215 through the oxidizing gas supply gap 235a.

According to the present embodiment, due to the structure of the above-described SOFC cartridge 203, the fuel gas and the oxidizing gas flow while facing the inner side and the outer side of the cell stack 101. Accordingly, the exhaust fuel gas that has passed through the power generation chamber 215 exchanges heat with the oxidizing gas supplied to the power generation chamber 215 through the inside of the substrate tube 103, is cooled to temperature at which deformation such as buckling of the lower tube plate 225b and the like made of metallic material does not occur, and is supplied to the fuel gas discharge header 219. The temperature of the oxidizing gas increases via the heat exchange with the exhaust fuel gas, and the fuel gas is supplied to the power generation chamber 215. As a result, it is possible to supply the oxidizing gas of which the temperature has increased to temperature necessary for power generation without using a heater or the like, to the power generation chamber 215.

After the DC power generated in the power generation chamber 215 is conducted to the vicinity of the end portion of the cell stack 101 by the lead film 115 made of Ni/YSZ or the like provided in the plurality of fuel cells 105, the DC power is collected on a current collecting rod (not illustrated) of the SOFC cartridge 203 through a current collecting plate (not illustrated), and is taken out to the outside of each of the SOFC cartridges 203. The DC power conducted to the outside of the SOFC cartridge 203 by the current collecting rod connects the generated power of each SOFC cartridge 203 to predetermined serial number and parallel number, is conducted to the outside of the SOFC module 201, converted to predetermined AC power via a power conversion device (such as an inverter), a power conditioner and the like (not illustrated), and is supplied to a power consumer (for example, electric load equipment or a power grid).

A schematic configuration of fuel cell system 310 according to embodiment of the present disclosure will be described.

Figure 4:
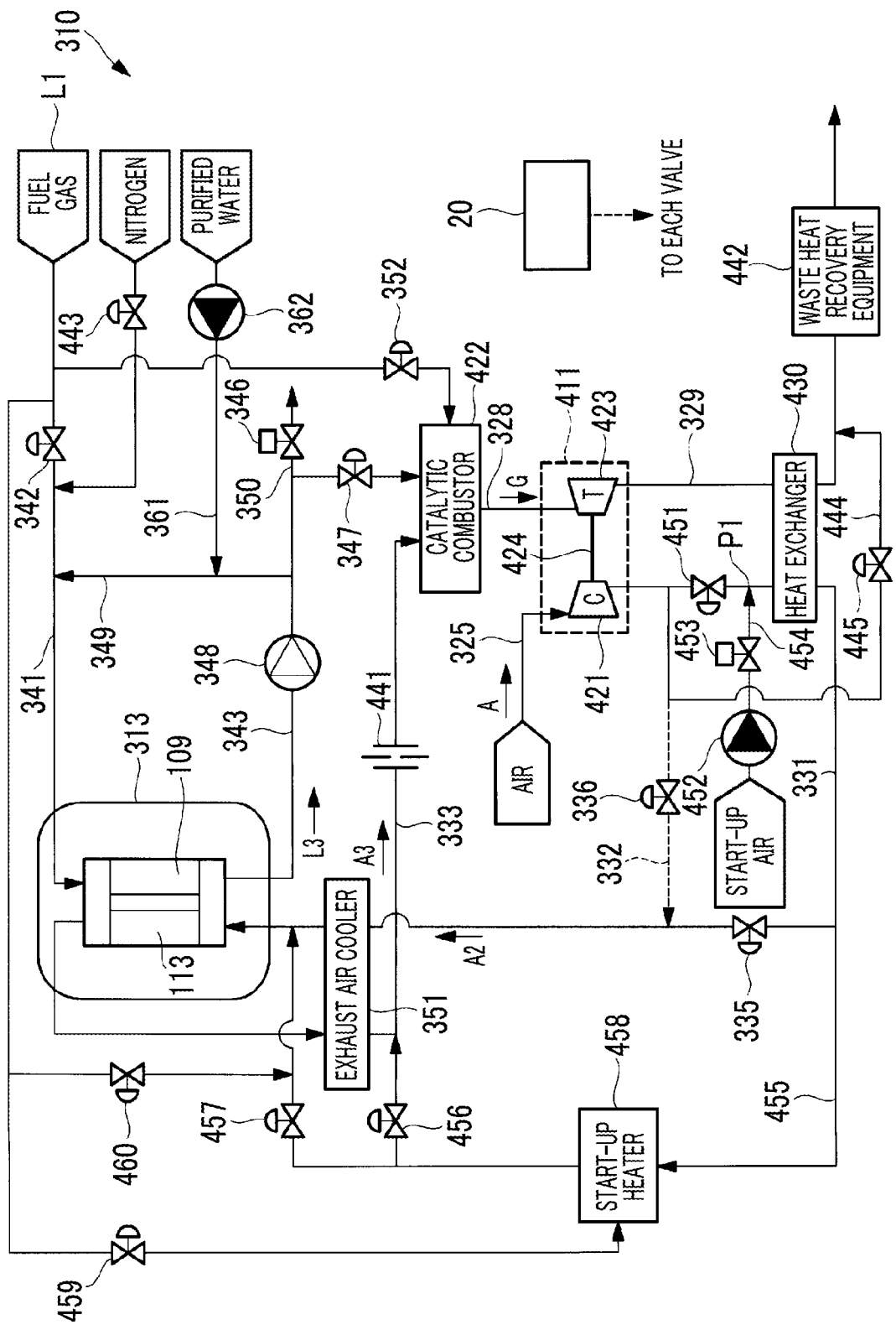
FIG. 4 shows a schematic configuration of fuel cell system according to the first embodiment of the present disclosure.

FIG. 4 shows a schematic configuration of the fuel cell system 310 according to the embodiment of the present disclosure. As illustrated in FIG. 4, the fuel cell system 310 includes a turbocharger 411 and SOFC 313. The SOFC 313 is configured by combining one or a plurality of SOFC modules (not illustrated), and is hereinafter simply referred to as "SOFC". The fuel cell system 310 uses the SOFC 313 to generate power. The fuel cell system 310 is controlled by the control unit 20.

The turbocharger 411 includes a compressor 421 and a turbine 423, and the compressor 421 and the turbine 423 are connected to each other by a rotary shaft 424 so as to be integrally rotatable. The compressor 421 is rotationally driven by rotation of the turbine 423 which will be described later. The present embodiment is example in which air is used as the oxidizing gas, and the compressor 421 compresses air A taken in from air intake line 325.

The air A is taken into the compressor 421 that configures the turbocharger 411 and is compressed, and the compressed air A is supplied as oxidizing gas A2 to the cathode 113 of the SOFC. Exhaust oxidizing gas A3 after being used in the chemical reaction for power generation in the SOFC is sent to a catalytic combustor (combustor) 422 via exhaust oxidizing gas line 333, exhaust fuel gas L3 used in the chemical reaction for power generation in the SOFC is boosted by a recycling blower 348, and a part of the exhaust fuel gas L3 is recycled and supplied to fuel gas line 341 via fuel gas recycling line 349, and the other part is sent to the catalytic combustor 422 via exhaust fuel gas line 343.

In this manner, a part of the exhaust fuel gas L3 and the exhaust oxidizing gas A3 is supplied to the catalytic combustor 422, and stably performs combustion even at relatively low temperature using a combustion catalyst in a catalytic combustion unit (not illustrated) (described below) to generate combustion gas G.

The catalytic combustor 422 mixes the exhaust fuel gas L3, the exhaust oxidizing gas A3, and fuel gas L1 if necessary, and combusts the mixed gas in the catalytic combustion unit to generate the combustion gas G. The catalytic combustion unit is filled with a combustion catalyst containing, for example, platinum or palladium as a main catalytic component, and stable combustion is possible at relatively low temperature and at a low oxygen concentration. The combustion gas G is supplied to the turbine 423 through combustion gas supply line 328. The turbine 423 is rotationally driven by the adiabatic expansion of the combustion gas G, and the combustion gas G is discharged from combustion exhaust gas line 329.

The fuel gas L1 is supplied to the catalytic combustor 422 by controlling the flow rate with a control valve 352. The fuel gas L1 is combustible gas, and, for example, gas obtained by vaporizing liquefied natural gas (LNG) or natural gas, town gas, hydrogen ($H_2$), carbon monoxide (CO), hydrocarbon gases such as methane ($CH_4$), and gas produced by a gasification facility from carbonaceous raw materials (petroleum, coal, and the like) are used. The fuel gas means fuel gas of which calorific value has been regulated to be substantially constant in advance.

The combustion gas G of which the temperature has been raised by combustion in the catalytic combustor 422 is sent to the turbine 423 that configures the turbocharger 411 through the combustion gas supply line 328, and the turbine 423 is rotationally driven to generate rotational power. By driving the compressor 421 with this rotational power, the air A taken in from the air intake line 325 is compressed to generate compressed air. Since the power of the rotating device that compresses and blows the oxidizing gas (air) can be generated by the turbocharger 411, the required additional power can be reduced, and the power generation efficiency of the power generation system can be improved.

A heat exchanger (regenerative heat exchanger) 430 exchanges heat between the exhaust gas discharged from the turbine 423 and the oxidizing gas A2 supplied from the compressor 421. The exhaust gas is cooled by heat exchange with the oxidizing gas A2, and then released to the outside through a chimney (not illustrated), for example, through waste heat recovery equipment 442.

The SOFC 313 generates power by reacting at predetermined operating temperature by supplying the fuel gas L1 as reducing agent and the oxidizing gas A2 as oxygen containing gas.

The SOFC 313 is constituted of an SOFC module (not illustrated) and accommodates an aggregate of the plurality of cell stacks provided in the pressure vessel of the SOFC module, and the anode 109, the cathode 113, and the solid electrolyte film 111 are provided in the cell stack (not illustrated).

The SOFC 313 generates power by supplying the oxidizing gas A2 to the cathode 113 and supplying the fuel gas L1 to the anode 109, converts the power to predetermined power via a power conversion device (such as an inverter) such as a power conditioner (not illustrated), and supplies the converted power to a power consumer.

The SOFC 313 is connected to oxidizing gas supply line 331 for supplying the oxidizing gas A2 compressed by the compressor 421 to the cathode 113. The oxidizing gas A2 is supplied to an oxidizing gas introduction unit (not illustrated) of the cathode 113 through the oxidizing gas supply line 331. The oxidizing gas supply line 331 is provided with a control valve 335 for regulating the flow rate of the oxidizing gas A2 to be supplied. In the heat exchanger 430, the oxidizing gas A2 exchanges heat with the combustion gas discharged from the combustion exhaust gas line 329, and the temperature thereof increases. Furthermore, heat exchanger bypass line 332 that bypasses the heat transfer part of the heat exchanger 430 is provided in the oxidizing gas supply line 331. A control valve 336 is provided in the heat exchanger bypass line 332 such that the bypass flow rate of the oxidizing gas can be regulated. By controlling the opening of the control valve 335 and the control valve 336, the flow ratio of the oxidizing gas passing through the heat exchanger 430 and the oxidizing gas bypassing the heat exchanger 430 is regulated, and the temperature of the oxidizing gas A2 to be supplied to the SOFC 313 is regulated. The temperature of the oxidizing gas A2 supplied to the SOFC 313 maintains temperature at which the fuel gas of the SOFC 313 and the oxidizing gas are electrochemically reacted to generate power, and the upper limit of temperature is limited so as not to damage the materials of each component on the inside of the SOFC module (not illustrated) that configures the SOFC 313.

The SOFC 313 is connected to the exhaust oxidizing gas line 333 for supplying the exhaust oxidizing gas A3 discharged after being used by the cathode 113 to the turbine 423 via the catalytic combustor 422. The exhaust oxidizing gas line 333 is provided with an exhaust air cooler 351. Specifically, in the exhaust oxidizing gas line 333, the exhaust air cooler 351 is provided on the upstream side of an orifice 441 described later, and the exhaust oxidizing gas A3 is cooled by heat exchange with the oxidizing gas A2 flowing through the oxidizing gas supply line 331.

The exhaust oxidizing gas line 333 is provided with a pressure loss unit. In the present embodiment, the orifice 441 is provided as a pressure loss unit. The orifice 441 adds pressure loss to the exhaust oxidizing gas A3 that flows through the exhaust oxidizing gas line 333. The pressure loss unit is not limited to the orifice 441, and a throttle such as a Venturi tube may be provided, and any means capable of adding pressure loss to the exhaust oxidizing gas A3 can be used. As the pressure loss unit, for example, an additional burner may be provided. The additional burner causes pressure loss in the exhaust oxidizing gas, and the additional fuel can be combusted when combustion exceeding the combustion capacity of the catalytic combustor 422 is required. Therefore, a sufficient amount of heat can be supplied to the exhaust oxidizing gas. In the fuel cell system 310, the pressure difference between the cathode 113 side and the anode 109 side is controlled by a regulating valve 347 provided in the exhaust fuel gas line 343 so as to be within predetermined range, and thus, by adding pressure loss to the exhaust oxidizing gas line 333 that merges with the exhaust fuel gas line 343, it is possible to ensure the operating differential pressure required for stable control of the regulating valve 347 provided in the exhaust fuel gas line 343.

The exhaust oxidizing gas line 333 is not provided with vent system and a vent valve for releasing the exhaust oxidizing gas A3 to the atmosphere (outside the system). For example, in case of power generation system that combines the SOFC and the gas turbine (for example, a micro gas turbine) that combusts the exhaust oxidizing gas A3 discharged from the cathode 113 and the exhaust fuel gas L3 discharged from the anode 109, there is case where the pressure state of the oxidizing gas supplied to the cathode 113 changes according to the change in the state of the micro gas turbine at the time of start-up or stop, and further, there is possibility that the differential pressure control between the anode 109 and the cathode 113 becomes unsuccessful because of sudden fluctuations in pressure. Therefore, in case where a trip occurs for some reason, the generator of the micro gas turbine becomes unloaded, and protection measures for the micro gas turbine are required. Therefore, vent system and a vent valve that release the exhaust oxidizing gas A3 to the outside of the system such as to the atmosphere are required. However, in the present embodiment, the turbocharger 411 is used, there is no generator communicating with the rotary shaft, and the load is not applied. Therefore, since there is no case where the load disappears during the trip, over-rotation occurs, and the pressure increases sharply, the differential pressure state can be stably controlled by the regulating valve 347, and thus, a mechanism (bent system and vent valve) for releasing the exhaust oxidizing gas A3 to the atmosphere can be omitted.

The SOFC 313 is further connected to the fuel gas line 341 for supplying the fuel gas L1 to a fuel gas introduction unit (not illustrated) of the anode 109, and to the exhaust fuel gas line 343 for supplying the exhaust fuel gas L3, which is discharged after being used for the reaction in the anode 109, to the turbine 423 via the catalytic combustor 422. The fuel gas line 341 is provided with a control valve 342 for regulating the flow rate of the fuel gas L1 supplied to the anode 109.

The recycling blower 348 is provided in the exhaust fuel gas line 343. The exhaust fuel gas line 343 is provided with the regulating valve 347 for regulating the flow rate of a part of the exhaust fuel gas L3 supplied to the catalytic combustor 422. In other words, the regulating valve 347 regulates the pressure state of the exhaust fuel gas L3. Therefore, as will be described later, the differential pressure between the anode 109 and the cathode 113 can be regulated by controlling the regulating valve 347 with the control unit 20.

Exhaust fuel gas release line 350 that releases the exhaust fuel gas L3 to the atmosphere (outside the system) is connected to the exhaust fuel gas line 343 on the downstream side of the recycling blower 348. A shutoff valve (fuel vent valve) 346 is provided on the exhaust fuel gas release line 350. In other words, by opening the shutoff valve 346, a part of the exhaust fuel gas L3 of the exhaust fuel gas line 343 can be released from the exhaust fuel gas release line 350. By discharging the exhaust fuel gas L3 to the outside of the system, the excess pressure can be quickly regulated. In the exhaust fuel gas line 343, the fuel gas recycling line 349 for recycling the exhaust fuel gas L3 to the fuel gas introduction unit of the anode 109 of the SOFC 313 is connected to the fuel gas line 341.

Furthermore, the fuel gas recycling line 349 is provided with purified water supply line 361 for supplying purified water for reforming the fuel gas L1 at the anode 109. The purified water supply line 361 is provided with a pump 362. By controlling the discharge flow rate of the pump 362, the amount of purified water supplied to the anode 109 is regulated. Since water vapor is generated at the anode during power generation, the exhaust fuel gas L3 of the exhaust fuel gas line 343 contains water vapor. Therefore, the water vapor is recycled and supplied by the fuel gas recycling line 349, and accordingly, the flow rate of purified water supplied by the purified water supply line 361 can be decreased or cut off.

Next, a configuration for releasing the oxidizing gas discharged from the compressor 421 will be described. Specifically, in the oxidizing gas supply line 331 on the downstream side of the compressor 421, oxidizing gas blow line 444 is provided such that the oxidizing gas can flow so as to bypass the heat exchanger 430 and be released. One end of the oxidizing gas blow line 444 is connected to the upstream side of the heat exchanger 430 of the oxidizing gas supply line 331, and the other end is connected to the downstream side of the heat exchanger 430 of the combustion exhaust gas line 329 which is the downstream side of the turbine 423. A blow valve (control valve) 445 is provided on the oxidizing gas blow line 444. In other words, by opening the blow valve 445, a part of the oxidizing gas discharged from the compressor 421 is released to the atmosphere outside the system through the chimney (not illustrated) via the oxidizing gas blow line 444.

Next, the configuration used for starting the fuel cell system 310 will be described. The oxidizing gas supply line 331 is provided with a control valve 451 on the downstream side of a connection point with the oxidizing gas blow line 444, and the downstream side (upstream side of the heat exchanger 430) of the control valve 451 is connected to start-up air line 454 having a blower 452 for supplying the start-up air and a control valve 453. When performing the start-up of the fuel cell system 310, while the blower 452 supplies the start-up air to the oxidizing gas supply line 331, the control valve 451 and the control valve 453 switch to the oxidizing gas from the compressor 421. In the oxidizing gas supply line 331, start-up air heating line 455 is connected to the downstream side (upstream side of the control valve 335) of the heat exchanger 430, is connected to the exhaust oxidizing gas line 333 on the downstream side of the exhaust air cooler 351 via the control valve 456, and is connected to the oxidizing gas supply line 331 (inlet side of the cathode 113) via a control valve 457. The start-up air heating line 455 is provided with a start-up heater 458, and the fuel gas L1 is supplied via a control valve 459 to heat the oxidizing gas flowing through the start-up air heating line 455.

The control valve 457 regulates the flow rate of the oxidizing gas supplied to the start-up heater 458, and controls the temperature of the oxidizing gas supplied to the SOFC 313.

The fuel gas L1 is also supplied to the cathode 113 via a control valve 460. The control valve 460 controls, for example, the flow rate of the fuel gas L1 supplied to the cathode 113 when the fuel gas L1 is supplied to the cathode 113 from the downstream side of the control valve 457 in the start-up air heating line 455 when the SOFC 313 is started, and the temperature of the power generation chamber is raised by catalytic combustion.

The control unit 20 controls the start-up of the fuel cell system 310. In the fuel cell system that combines the SOFC and the turbocharger 411, the turbocharger 411 cannot be started independently unlike a micro gas turbine, for example. Therefore, it is necessary to supply the start-up air from the outside. Therefore, at the time of start-up, it is necessary to switch the supply of the oxidizing gas supplied to the SOFC from the start-up air to the oxidizing gas compressed by the compressor 421 of the turbocharger 411. Therefore, the control unit 20 controls the control valve 451 and the blow valve 445.

Figure 5:
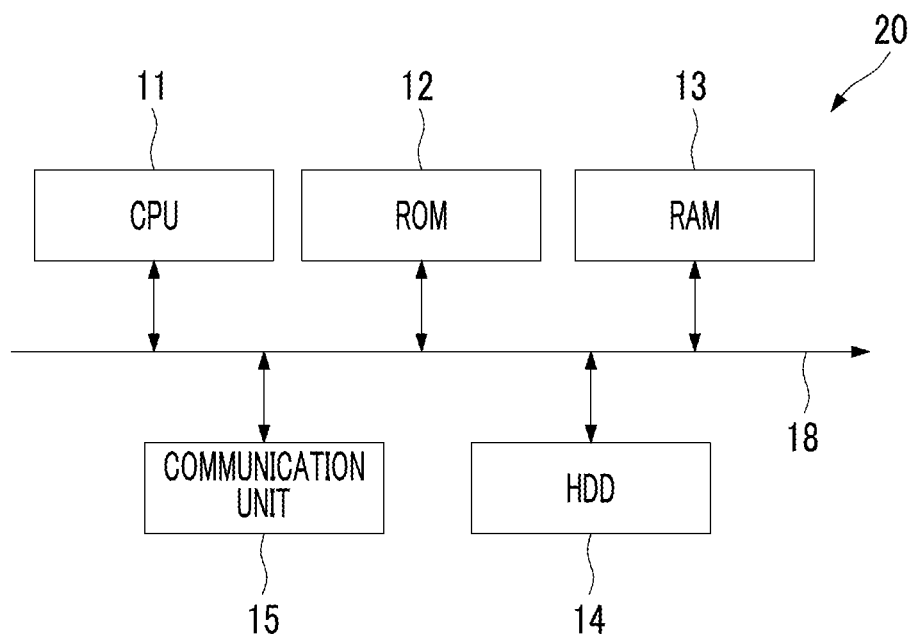
FIG. 5 shows example of a hardware configuration of a control unit according to the first embodiment of the present disclosure.

FIG. 5 shows example of a hardware configuration of the control unit 20 according to the present embodiment.

As illustrated in FIG. 5, the control unit 20 is computer system (computing system), and includes, for example, a CPU 11, a read only memory (ROM) 12 for storing a program or the like executed by the CPU 11, a random access memory (RAM) 13 that functions as a work region at the time of executing each program, a hard disk drive (HDD) 14 as a large-capacity storage device, and a communication unit 15 for connecting to a network or the like. As the large-capacity storage device, a solid state drive (SSD) may be used. Each of these parts is connected via a bus 18.

The control unit 20 may include an input unit including a keyboard, a mouse, and the like; and a display unit including a liquid crystal display device for displaying data.

The storage medium for storing the program or the like executed by the CPU 11 is not limited to the ROM 12. For example, the storage medium may be another auxiliary storage device such as a magnetic disk, a magneto-optical disk, or a semiconductor memory.

A series of processes for realizing various functions (will be described later) is stored in the hard disk drive 14 or the like in the form of a program, the CPU 11 reads the program into the RAM 13 or the like and executes information processing and arithmetic processing, and accordingly, various functions are realized. The program may be installed in advance in the ROM 12 or other storage medium, provided in state of being stored in a computer-readable storage medium, or delivered via wired or wireless communication means. Examples of the computer-readable storage medium include a magnetic disk, a magneto-optical disk, a CD-ROM, a DVD-ROM, or a semiconductor memory.

In case of performing the start-up, the control unit 20 decreases the opening of the blow valve 445, increases the opening of the control valve 451 after the timing at which the opening of the blow valve 445 is started to be decreased, and then stops the supply the start-up air in state where the control valve 451 is closed and the blow valve 445 is opened to supply the start-up air to the oxidizing gas supply line 331 with the blower 452.

As illustrated in FIG. 4, the SOFC 313 includes the cathode 113 and the anode 109, and the turbocharger 411 includes the turbine 423 in which the exhaust fuel gas L3 and the exhaust oxidizing gas A3 discharged from the fuel cell are combusted by the catalytic combustor 422 and supplied as the combustion gas G, and the compressor 421 that is rotationally driven by the rotating turbine 423. In state where the SOFC 313 and the turbocharger 411 are combined in this manner, the oxidizing gas supply line 331 supplies the oxidizing gas compressed by the compressor 421 to the cathode 113, and the oxidizing gas supply line 331 is provided with the control valve 451. Then, one end of the oxidizing gas blow line 444 that discharges the oxidizing gas to the outside of the system via the blow valve 445 is connected to the upstream side (outlet side of the compressor 421) of the control valve 451 in the oxidizing gas supply line 331. Then, one end of the start-up air line 454 for supplying the start-up air to the oxidizing gas supply line 331 with the blower 452 is connected to the downstream side (between the control valve 451 and the heat exchanger 430) of the control valve 451 in the oxidizing gas supply line 331.

Figure 6:
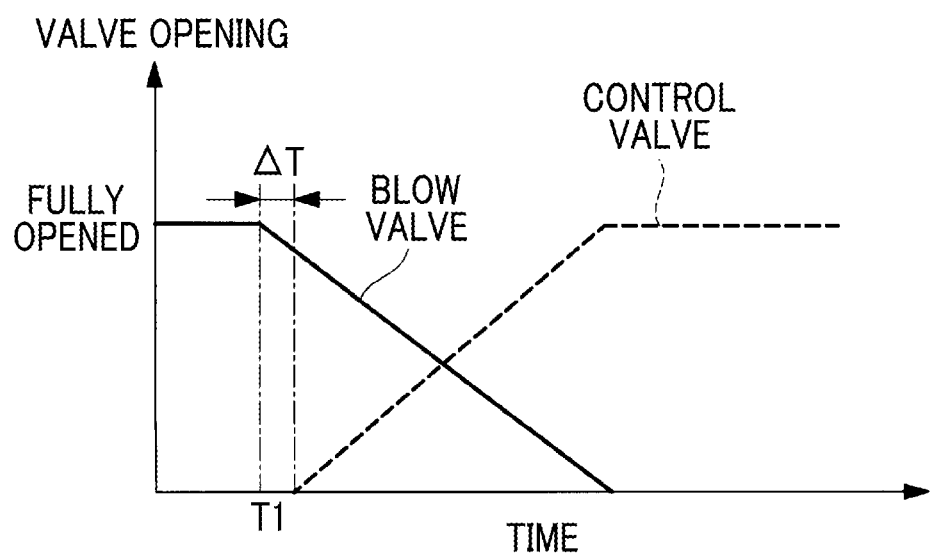
FIG. 6 shows example of cross control according to the first embodiment of the present disclosure.

When starting the fuel cell system 310, it is necessary to make the turbocharger 411 self-sustaining. Therefore, first, the turbine 423 is rotationally driven by the start-up air. Therefore, although the details will be described later, in case of performing start-up, the control valve 451 is closed and the blow valve 445 is opened to supply the start-up air to the oxidizing gas line, and the oxidizing gas discharged from the compressor 421 of the turbocharger 411, which is not sufficiently self-sustaining, is discharged to the outside of the system from the oxidizing gas blow line 444. In order to make the turbocharger 411 self-sustaining from such state, the flow rate of the start-up air flowing through the oxidizing gas supply line 331 is first reduced, and then the flow rate of the oxidizing gas compressed by the compressor 421 flowing through the oxidizing gas supply line 331 is increased. After this, the switching is performed. In other words, as illustrated in FIG. 6, the opening of the blow valve 445 is decreased and the opening of the control valve 451 is increased. After the switching is completed, the supply of start-up air is stopped.

Here, in case where the control of each valve is not properly performed and the pressure on the outlet side of the compressor 421 in the oxidizing gas supply line 331 becomes lower than the pressure of connecting portion P1 between the start-up air line 454 and the oxidizing gas supply line 331, there is possibility that the oxidizing gas and the start-up air flow backward to the compressor 421. Therefore, the control unit 20 controls the start-up such that backward flow does not occur.

Specifically, the control unit 20 decreases the opening of the blow valve 445 in case where the rotation speed of the turbocharger 411 is equal to or higher than predetermined value or where the temperature of the combustion gas supplied to the turbine 423 is equal to or higher than predetermined temperature. In other words, in case where it is assumed that the rotation speed of the turbocharger 411 increases and that the pressure on the outlet side of the compressor 421 increases sufficiently, the opening of the blow valve 445 starts to be decreased. FIG. 6 illustrates example of the open and close control state of the control valve 451 and the blow valve 445. The control unit 20 starts closing the blow valve 445 at the timing of T1.

Then, the control unit 20 starts increasing the opening of the control valve 451 after predetermined time (ΔT in FIG. 6) elapses from T1 which is the timing when the opening of the blow valve 445 starts to be decreased. Here, by allowing predetermined time to elapse from the opening control (start of closing operation) of the blow valve 445 to the opening control (start of opening operation) of the control valve 451, the backward flow of the oxidizing gas and the start-up air can be effectively suppressed. Then, as illustrated in FIG. 6, the blow valve 445 closes to fully closed opening with the passage of time, and the control valve 451 opens until the opening reaches predetermined opening (for example, opening matching for design flow rate) with the passage of time. In other words, the blow valve 445 and the control valve 451 are switched between the open and closed states by cross control having predetermined time interval ΔT at the start of operation of each valve. The opening of the blow valve 445 and the control valve 451 is not limited to the case where the opening is increased or decreased at constant rate of change as illustrated in FIG. 6. For example, the opening of the blow valve 445 and the control valve 451 is set to open and close quickly when the opening is large and to gradually open and close when the opening is small, depending on the characteristics of the valves, and as a whole, the total operating time associated with opening and closing may not be extended. As a general characteristic of a valve, when the valve opening is small, the change in the passing flow rate with respect to the valve opening is sensitive, and thus, stable operation can be obtained by gradually opening and closing.

In this manner, the time interval (time difference) ΔT is provided at each control start timing of the closing control of the blow valve 445 and the opening control of the control valve 451. In this manner, since the blow valve 445 starts to close first and the pressure on the outlet side of the compressor 421 increases and then the control valve 451 starts to open, it is possible to perform switching while suppressing the backward flow more effectively.

Figure 9:
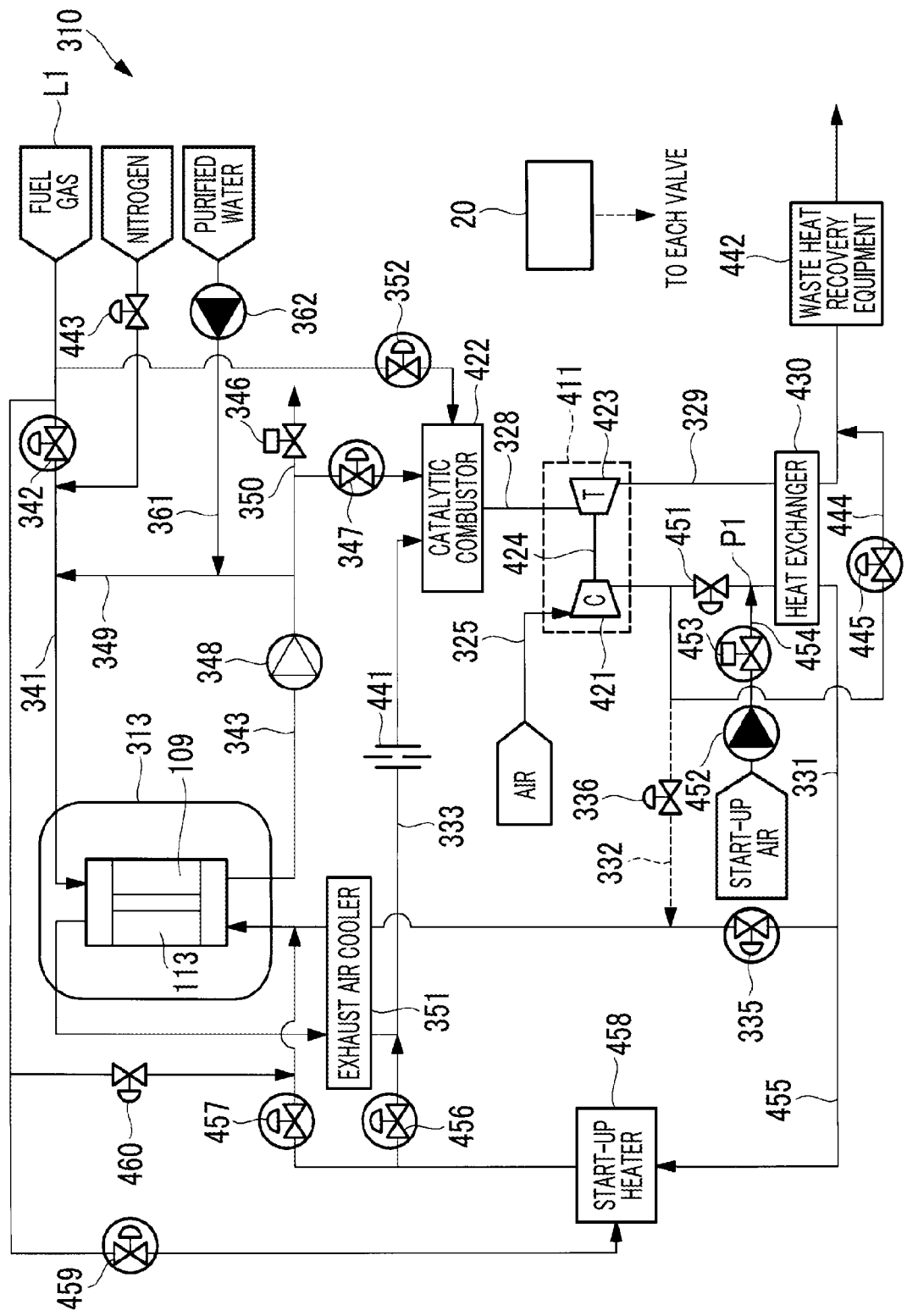
FIG. 9 shows state of the fuel cell system in case where a catalytic combustor according to the first embodiment of the present disclosure is ignited.
Figure 10:
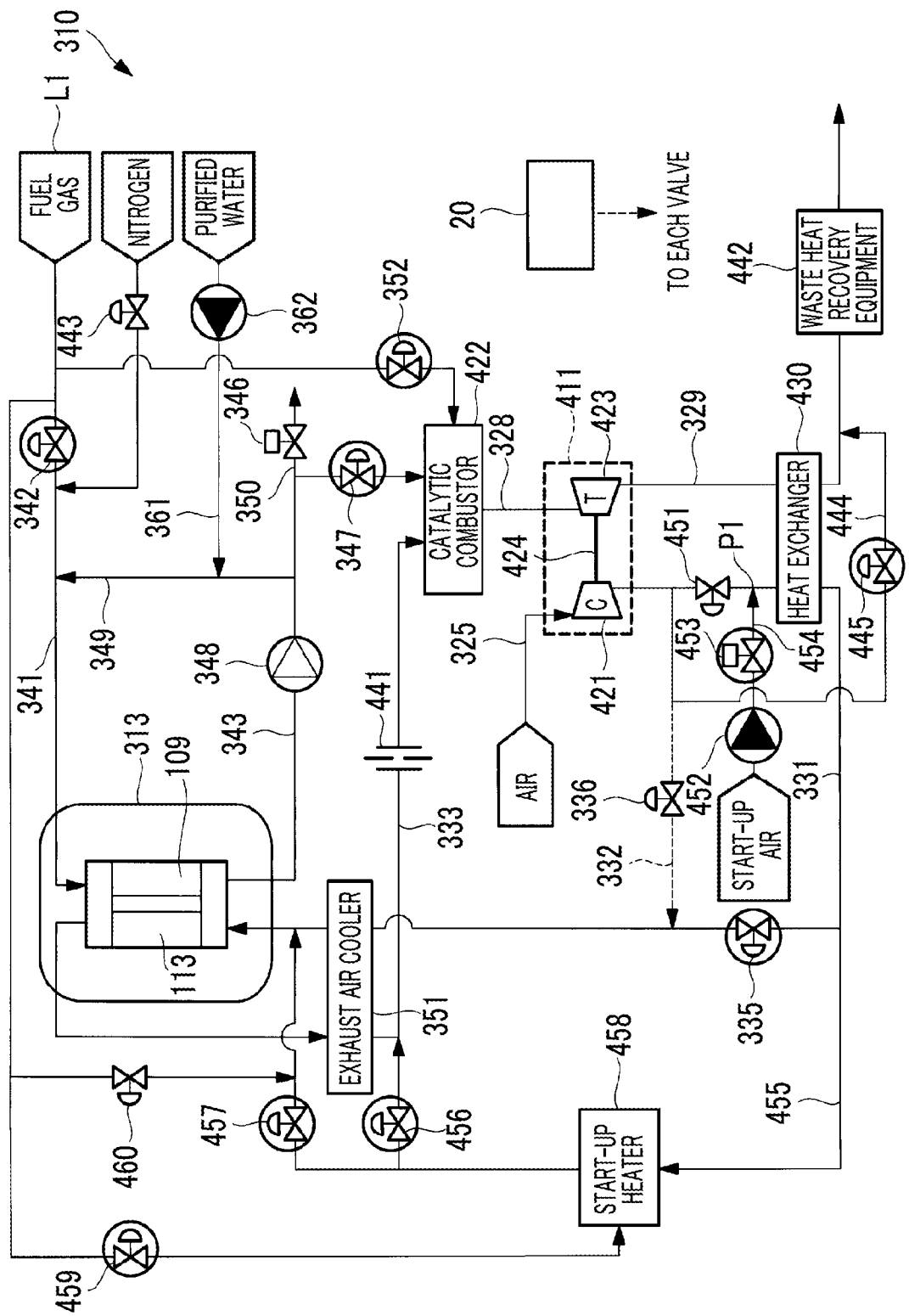
FIG. 10 shows state of the fuel cell system in case where the turbocharger according to the first embodiment of the present disclosure is self-sustaining.

Next, method for starting the fuel cell system 310 will be described with reference to FIGS. 7 to 10. Specifically, FIG. 7 illustrates case where line purge is performed before the start-up, FIG. 8 illustrates case where the start-up heater 458 is ignited, FIG. 9 illustrates case where the catalytic combustor 422 is ignited, and FIG. 10 illustrates case where the turbocharger 411 is self-sustaining.

Figure 7:
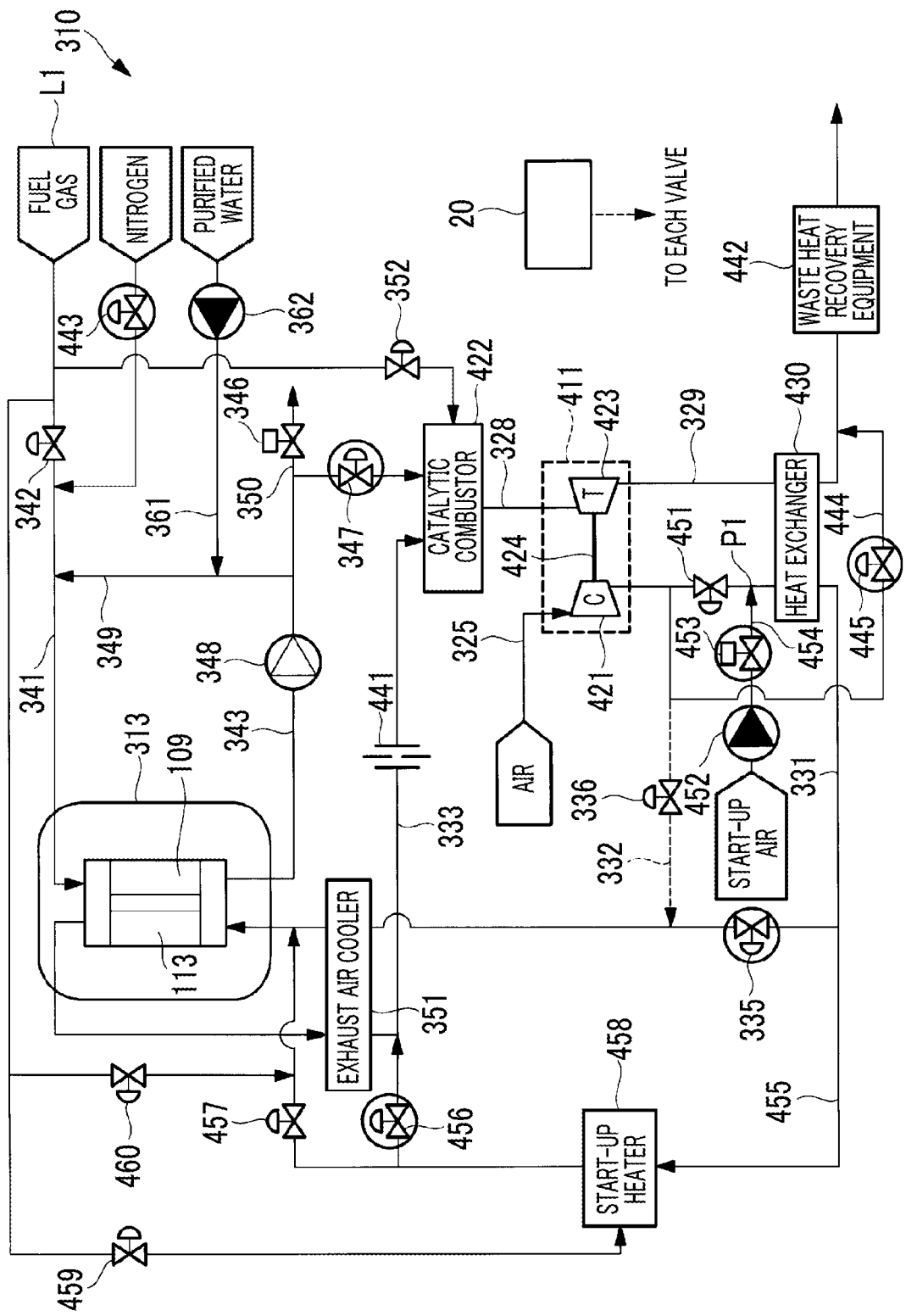
FIG. 7 shows state of fuel cell system in case where line purge before start-up according to the first embodiment of the present disclosure is performed.

First, as illustrated in FIG. 7, the line purge before start-up is performed.

Specifically, the control valve 443, the control valve 453, the blow valve 445, the control valve 335, the control valve 456, and the regulating valve 347 are opened, and the other valves are closed. In FIG. 7, the valve in the open state is surrounded by "○". In other words, nitrogen is ventilated on the anode 109 side by opening the control valve 443. Then, the blower 452 starts, and the start-up air is supplied to the cathode 113 side and is ventilated by opening the control valve 453 and the control valve 335. Accordingly, the SOFC 313 is purged. When the control valve 456 is opened, the start-up air bypasses the SOFC 313 and is ventilated to the catalytic combustor 422 via the start-up heater 458. Accordingly, the turbine 423 is started to rotate by the start-up air. As the turbine 423 rotates, the coaxially connected compressor 421 starts rotating. The compressor 421 compresses the oxidizing gas, and the compressed oxidizing gas is discharged to the outside of the system through the oxidizing gas blow line 444 when the blow valve 445 is open. Surging of the compressor 421 is prevented by being discharged to the outside of the system. Surging is abnormal state where the pressure at the outlet of the compressor 421 is raised, and the compressor 421 stalls or the compressed air flows backward. The differential pressure control between the anode 109 and the cathode 113 is performed by the regulating valve 347.

Figure 8:
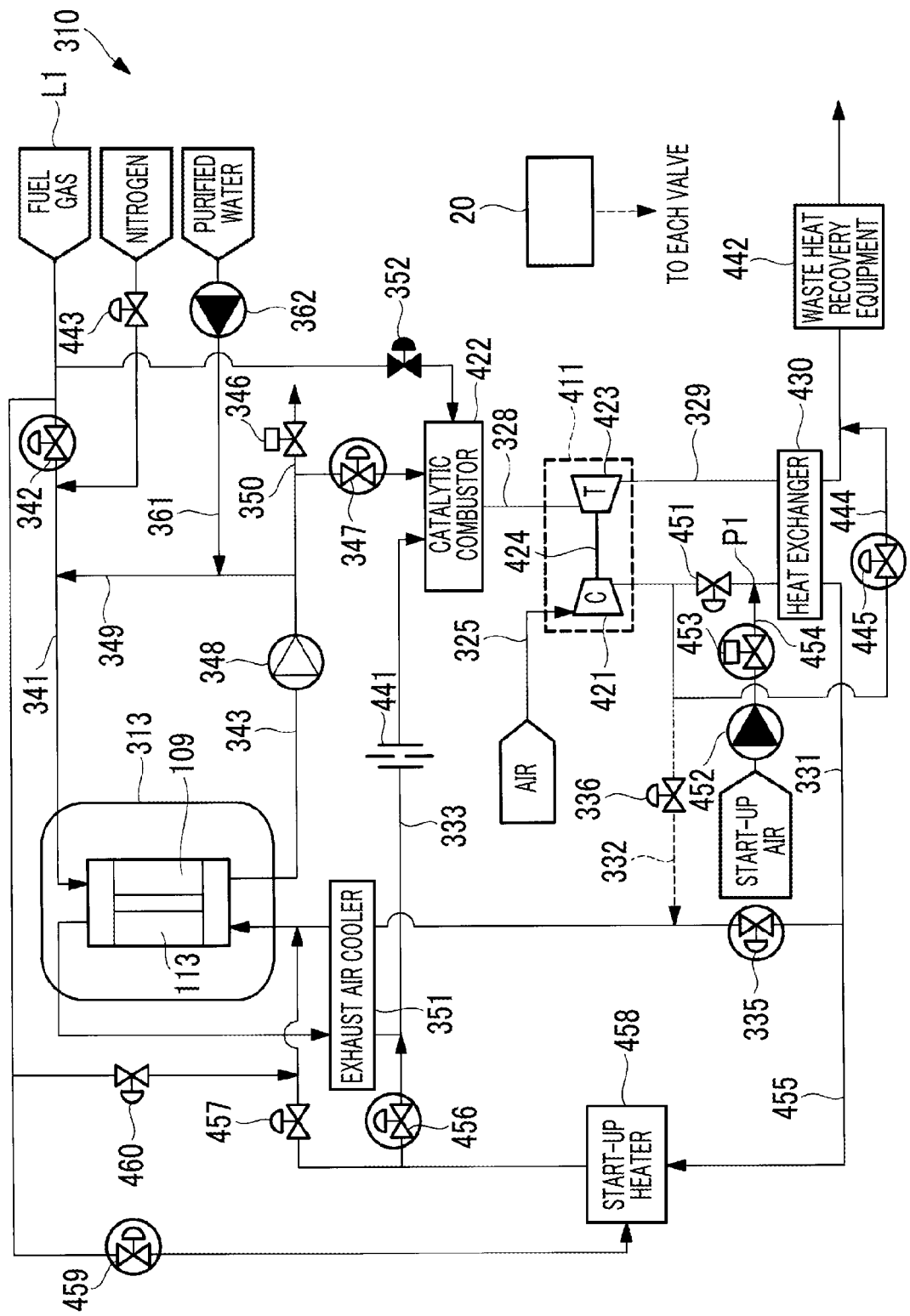
FIG. 8 shows state of the fuel cell system in case where a start-up heater according to the first embodiment of the present disclosure is ignited.

Next, when the purging of the SOFC 313 is completed, the start-up heater 458 is ignited as illustrated in FIG. 8.

Specifically, the control valve 342, the control valve 453, the blow valve 445, the control valve 335, the control valve 456, the control valve 459, and the regulating valve 347 are opened, and the other valves are closed. In FIG. 8, the valve in the open state is surrounded by "◯". The control valve 457 may be opened depending on the situation. In other words, after the purging is completed, the control valve 456 is throttled and the control valve 335 is opened to reduce the flow rate of the start-up air supplied to the catalytic combustor 422 by bypassing the SOFC 313 and to increase the start-up air supplied to the SOFC 313. On the anode 109 side, the control valve 443 is closed to stop the supply of nitrogen, and the control valve 342 is opened to start the supply of the fuel gas L1. At this stage, the catalytic combustor 422 is not ignited, and the gas that has passed through the catalytic combustor 422 without being combusted is discharged to the outside of the system from the combustion exhaust gas line 329 via the turbine 423. The differential pressure control between the anode 109 and the cathode 113 is performed by the regulating valve 347. Then, a part of the fuel gas L1 is supplied from the control valve 459 to ignite the start-up heater 458, and the temperature of the start-up air is raised. Accordingly, the inlet temperature of the turbine 423 is raised and the pressure inside the system is raised.

Next, as illustrated in FIG. 9, the catalytic combustor 422 is ignited.

Specifically, the control valve 342, the control valve 453, the blow valve 445, the control valve 335, the control valve 456, the control valve 459, the control valve 352, and the regulating valve 347 are opened, and the other valves are closed. In FIG. 9, the valve in the open state is surrounded by "◯". In other words, the start-up air of approximately 400° C. to 500° C. sent to the catalytic combustor 422 in state where the control valve 456 is slightly opened (approximately 20% of the start-up air amount) and the start-up air sent from the SOFC 313 via the control valve 457 are mixed and supplied. Accordingly, the temperature of the catalytic combustor 422 is raised. When the inlet temperature of the catalytic combustor 422 reaches specified temperature (for example, 300° C. to 400° C.), the fuel gas L1 is supplied to the catalytic combustor 422 via the control valve 352. When the fuel gas L1 is supplied, the control valve 352 is temporarily held at specified opening, and ignition is confirmed by observing increase in the outlet temperature of the catalytic combustor 422. Then, the control valve 352 is subjected to opening control (flow rate control of the fuel gas L1) according to the outlet temperature of the catalytic combustor 422.

Next, as illustrated in FIG. 10, the turbocharger 411 is self-sustaining.

Specifically, the control valve 342, the control valve 453, the control valve 335, the control valve 456, the control valve 459, the control valve 352, and the regulating valve 347 are opened, and the other valves are closed. In FIG. 10, the valve in the open state is surrounded by "◯". The blow valve 445 is controlled in closing direction, and the control valve 451 is controlled in opening direction. In other words, in case where the required condition for self-sustenance of the turbocharger 411 is satisfied, the blow valve 445 is gradually closed and the control valve 451 is gradually opened. The required condition for self-sustenance is case where the rotation speed of the turbocharger 411 is equal to or higher than predetermined value and the temperature (the outlet temperature of the catalytic combustor 422) of the combustion gas G supplied to the turbine 423 is equal to or higher than the predetermined temperature. In other words, as illustrated in FIG. 6, the blow valve 445 and the control valve 451 are cross-controlled. Accordingly, the flow rate of the oxidizing gas discharged to the outside of the system is reduced. In state where the cross control is performed, the pressure on the outlet side of the compressor 421 is maintained in state of being higher than the pressure of the connecting portion P1. When the cross control ends, the blow valve 445 is fully closed, and the control valve 451 reaches predetermined opening (for example, fully opened state), the control valve 453 is closed, the blower 452 is stopped, and the supply of start-up air ends. It is preferable that the supply amount of the start-up air is increased in accordance with the increase in the rotation speed of the turbocharger 411 and the increase in the outlet temperature of the catalytic combustor 422. Accordingly, the turbine 423 is rotated by the oxidizing gas compressed by the compressor 421 to rotationally drive the compressor 421, and thus, the turbocharger 411 is in self-sustaining operating state.

Next, after the turbocharger 411 becomes self-sustaining, each valve is controlled to continue the temperature rise. As specific example in the present embodiment, the inlet temperature of the catalytic combustor 422 is controlled by the control valve 456 for the oxidizing gas. For the fuel gas L1, the outlet temperature of the catalytic combustor 422 is controlled by the control valve 352. The control valve 457 controls the air flow rate passing through the start-up heater 458. The control valve 459 regulates the flow rate of the fuel gas L1 supplied to the start-up heater 458 to control the outlet temperature of the start-up heater 458. The control valve 335 has programmed opening and is set according to the rotation speed or the inlet temperature of the turbocharger 411. The control target and the control object are not limited to the above-described examples. In this manner, the temperature of each part of the turbocharger 411 after becoming self-sustaining is raised.

Figure 11:
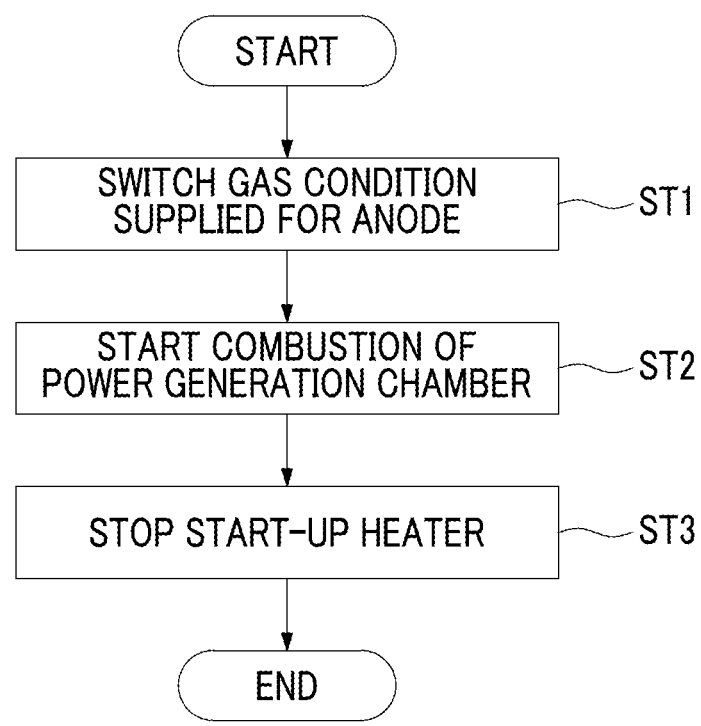
FIG. 11 shows example of a temperature raising process after the turbocharger according to the first embodiment of the present disclosure becomes self-sustaining.

In other cases, the temperature is raised and the pressure is boosted. For example, as illustrated in FIG. 11, each process is performed. The order of each process in FIG. 11 is not limited to the case illustrated in FIG. 11.

Specifically, in case where the inlet fuel temperature of the SOFC 313 is equal to or higher than the specified temperature and the temperature of the power generation chamber 215 of the SOFC 313 is equal to or higher than the specified temperature after the turbocharger 411 becomes self-sustaining, the gas condition supplied for the anode is switched from the gas at the time of stopping or purging (ST1).

Combustion of the power generation chamber 215 of the SOFC 313 is started (ST2). Specifically, in case where the temperature (for example, the maximum temperature among a plurality of measurement points) of the power generation chamber 215 reaches the specified temperature, the control valve 460 is opened and small flow rate of fuel gas L1 is supplied to the cathode 113 to start the combustion of the power generation chamber 215, and the temperature of the power generation chamber 215 of the SOFC 313 is further raised. At the cathode 113 into which the air and the fuel gas L1 flow, the fuel gas L1 is catalytically combusted at the cathode 113 by the catalytic reaction of the cathode 113 to raise the cathode 113 using the heat generated by combustion.

The start-up heater 458 is stopped (ST3). Specifically, as the temperature of the oxidizing gas at the inlet on the cathode 113 side reaches the specified temperature (or as the temperature of the power generation chamber 215 reaches the specified temperature), the opening of the control valve 457 is controlled in the closing direction, and in case where the air flow rate supplied to the start-up heater 458 is reduced until reaching the allowable lower limit of the start-up heater 458, the start-up heater 458 is stopped. In other words, after the turbocharger becomes self-sustaining, the air heated by the start-up heater 458 is supplied to the SOFC 313, and the temperature is raised until the temperature of the oxidizing gas supplied to the cathode 113 or the temperature of the power generation chamber 215 reaches the specified temperature.

Then, after the start-up state of the fuel cell system 310 is regulated by each control as described above, power generation is started. Specifically, after the temperature (for example, the lowest temperature among the temperatures at the plurality of measurement points) of the power generation chamber 215 has reached the specified temperature (for example, 750° C.), and the operating states of the anode 109 and the cathode 113 have reached the predetermined conditions, the control valve 342 for supplying fuel gas is opened to supply the fuel gas L1 to the anode 109, the pump 362 of the purified water supply line 361 is driven to supply purified water to the anode 109, and the SOFC 313 starts power generation. The temperature of the power generation chamber 215 is increased by heat generated by both catalytic combustion by adding and supplying the fuel gas L1 to the cathode 113 and heat generated by power generation. After the power generation chamber temperature of the SOFC 313 is raised until the temperature can be maintained by self-heating by means of power generation, the supply amount of the fuel gas L1 added and supplied to the cathode 113 is gradually reduced, and, for example, control is performed such that the addition and supply of the fuel gas L1 to the cathode 113 become zero at the same time when the target load is reached. Then, for example, when the mode is shifted to the load rise mode, the temperature of the power generation chamber 215 of the SOFC 313 reaches the target temperature, and the load reaches the target load such as the rated load, and the start-up is completed.

Accordingly, the fuel cell system 310 is started.

Figure 12:
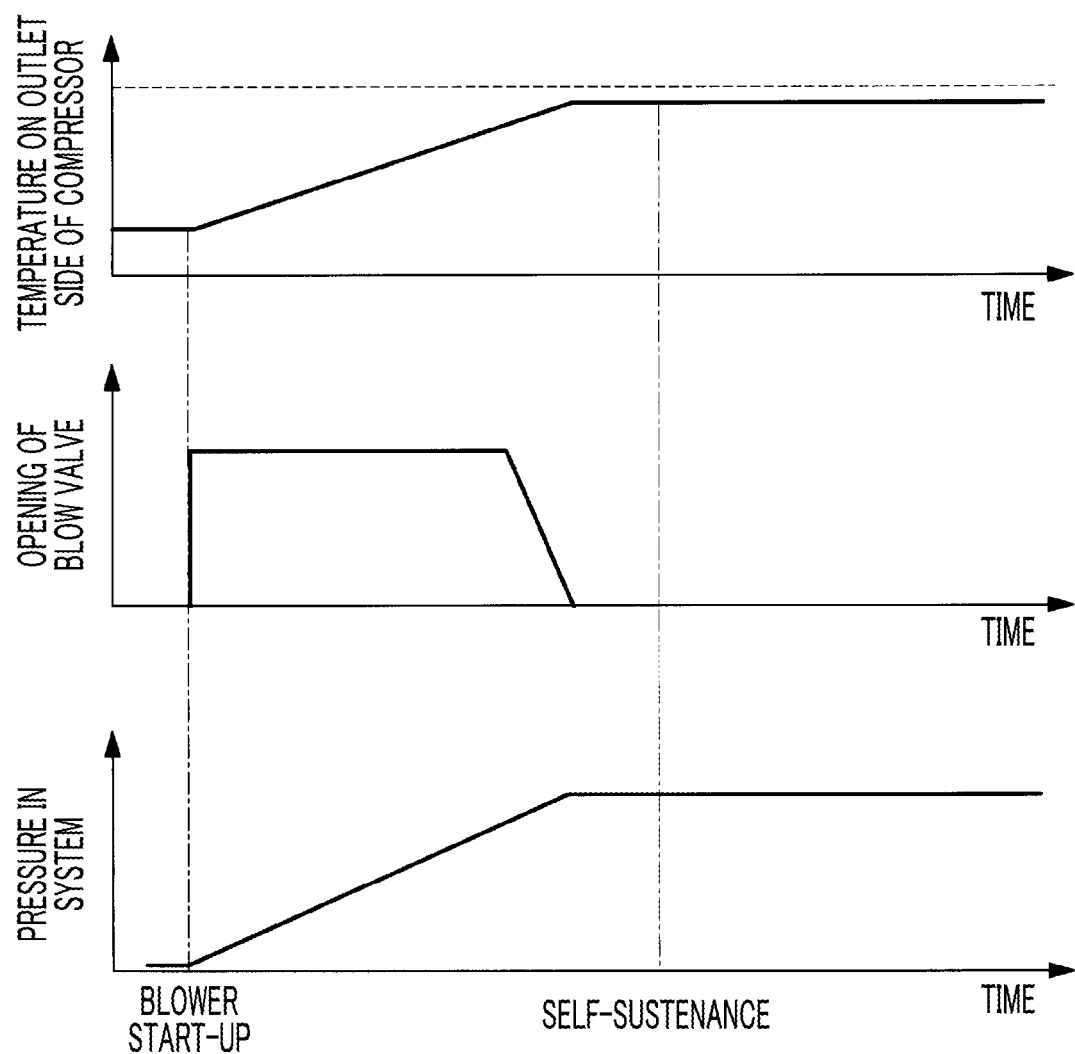
FIG. 12 shows example of state transition in start-up according to the first embodiment of the present disclosure.

Next, example of the state transition at start-up will be described. FIG. 12 illustrates the transition of state with the passage of time of the temperature on the outlet side of the compressor 421, the opening of the blow valve 445, and the pressure in the system. The pressure in the system is, for example, the pressure on the outlet side of the compressor 421.

When the blower 452 is started and the start-up air is supplied, the pressure in the system is raised by this. Along with this, the temperature on the outlet side of the compressor 421 is also raised. Then, when the above-described required condition for self-sustenance of the turbocharger 411 is established, the blow valve 445 is gradually closed. The control valve 451 is also controlled in the opening direction by the cross control as illustrated in FIG. 6. When the outlet temperature of the compressor 421 reaches predetermined temperature, the blow valve 445 is fully closed, and the pressure in the system reaches the predetermined pressure, and the turbocharger 411 becomes self-sustaining.

Figure 13:
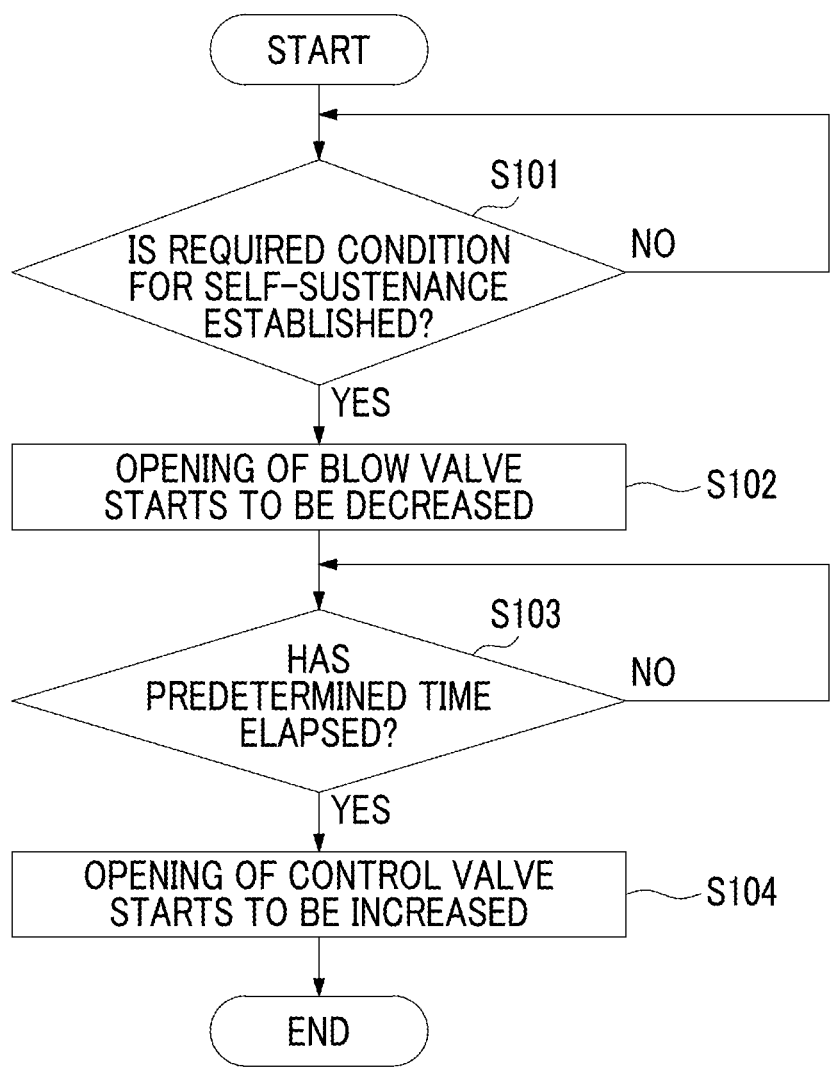
FIG. 13 shows example of a flowchart of procedure of self-sustaining control according to the first embodiment of the present disclosure.

Next, example of control regarding the self-sustenance of the turbocharger 411 by the above-described control unit 20 will be described with reference to FIG. 13. FIG. 13 is a flowchart illustrating example of control procedure related to the self-sustenance of the turbocharger 411. The flow illustrated in FIG. 13 is executed in case of performing start-up, for example, in case of performing cross control in state where the control valve 451 is closed and the blow valve 445 is opened to supply the start-up air to the oxidizing gas supply line 331 with the blower 452.

First, it is determined whether or not the required condition for self-sustenance_is satisfied (S101). The required condition for self-sustenance_is case where the rotation speed of the turbocharger 411 is equal to or higher than predetermined value and the temperature of the combustion gas supplied to the turbine 423 is equal to or higher than the predetermined temperature.

In case where the required condition for self-sustenance_is not satisfied (NO determination in S101), S101 is executed again.

In case where the required condition for self-sustenance_is satisfied (YES determination in S101), the opening of the blow valve 445 starts to be decreased (S102).

Then, it is determined whether or not the predetermined time has elapsed (S103). In case where the time interval (predetermined time) ΔT has not elapsed (NO determination in S103), S103 is executed again.

In case where the predetermined time has elapsed (YES determination in S103), the opening of the control valve 451 starts to be increased (S104).

In this manner, the blow valve 445 and the control valve 451 are cross-controlled.

As described above, according to the fuel cell system and the method for starting the same according to the present embodiment, in the fuel cell system 310 in which the SOFC 313 and the turbocharger 411 are combined, the turbocharger 411 cannot be started independently unlike the gas turbine, for example, and thus, the turbocharger 411 is started by using the start-up air supplied from the start-up air line 454. Then, after it is assumed that the pressure on the outlet side of the compressor 421 is raised sufficiently, by using the control valve 451 provided on the oxidizing gas supply line 331 and the blow valve 445 provided on the oxidizing gas blow line 444 that discharges the oxidizing gas to the outside of the system, the oxidizing gas flowing through the oxidizing gas supply line 331 is switched to the oxidizing gas compressed by the compressor 421 from the start-up air and is sent out. Specifically, from the state where the control valve 451 is closed and the blow valve 445 is opened to supply the start-up air to the oxidizing gas supply line 331 with the blower 452 (that is, state where the start-up air is flowing), by opening the control valve 451 (cross control) while decreasing the opening of the blow valve 445, switching to the oxidizing gas compressed by the compressor 421 and sent out is performed. When performing the switching in this manner, by increasing the opening of the control valve 451 after the timing at which the opening of the blow valve 445 is started to be decreased, and by providing a time difference between the start of operation of the blow valve 445 and the control valve 451, the pressure on the outlet side of the compressor 421 in the oxidizing gas supply line 331 does not become lower than the pressure at the connecting portion P1 between the start-up air line 454 and the oxidizing gas supply line 331, and the backward flow of the oxidizing gas and the start-up air can be suppressed more effectively. In other words, since the control valve 451 is opened in state where the opening of the blow valve 445 is decreased, and the pressure on the upstream side (outlet side of the compressor 421) of the control valve 451 is increased, the switching can be performed more stably. As a result, even in case where the SOFC 313 and the turbocharger 411 are combined, the start-up can be performed more stably.

By increasing the opening of the control valve 451 after predetermined time elapses from the timing when the opening of the blow valve 445 starts to be decreased, it is possible to more effectively suppress the backward flow of the oxidizing gas and the start-up air.

According to the fuel cell system and the method for starting the same according to the present embodiment, the temperature or the pressure of the SOFC 313 is raised at the same time as the start-up of the turbocharger 411. At the time of start of start-up, as a purging step of the SOFC 313, the control valve 456 has predetermined opening, the start-up air bypasses the SOFC 313, is ventilated to the catalytic combustor 422 via the start-up heater 458, and is supplied to the turbine 423, and accordingly, the turbine 423 starts to be rotationally driven by the start-up air. The SOFC 313 is ventilated with the control valve 335 at the specified opening. After the purging step is completed, the opening of the control valve 335 is decreased and the opening of the control valve 456 is increased. The fuel gas L1 is supplied from the control valve 459 to ignite the start-up heater 458, and to raise the temperature of the start-up air. The control valve 456 is throttled, and the control valve 335 is opened to reduce the flow rate of the start-up air supplied to the catalytic combustor 422 by bypassing the SOFC 313 and to increase the start-up air supplied to the SOFC 313. After this, the fuel gas L1 is supplied from the control valve 459 to ignite the start-up heater 458, and to raise the temperature of the start-up air. Accordingly, the inlet temperature of the turbine 423 is raised, the rotation speed of the turbocharger 411 is raised, and the pressure inside the system is raised. Further, the fuel gas L1 is supplied to the catalytic combustor 422 via the control valve 352.

Accordingly, when the rotation speed of the turbocharger 411 is equal to or higher than the predetermined value and the temperature (the outlet temperature of the catalytic combustor 422) of the exhaust combustion gas G supplied to the turbine 423 is equal to or higher than the predetermined temperature, cross control is performed to control the control valve 451 in the opening direction after predetermined time has elapsed since control of the blow valve 445 in the closing direction is started. When the blow valve 445 is fully closed, and the control valve 451 reaches predetermined opening (for example, design flow rate opening), the control valve 453 is closed, the blower 452 is stopped, and the supply of start-up air ends. In other words, the turbine 423 is rotated by the oxidizing gas compressed by the compressor 421 to rotationally drive the compressor 421, and thus, the turbocharger 411 is in independently operating state.

After this, when the temperature of the power generation chamber 215 reaches the specified temperature, the SOFC 313 opens the control valve 460 to supply small flow rate of the fuel gas L1 to the cathode 113, the fuel gas L1 is catalyzed by the catalytic action of the cathode 113 and combusted, and the temperature of the power generation chamber 215 is raised.

Second Embodiment

Next, the fuel cell system and the method for starting the fuel cell system according to second embodiment of the present disclosure will be described.

In the present embodiment, case where the control valve 451 and the blow valve 445 are controlled differently will be described. Hereinafter, the fuel cell system and the method for starting the fuel cell system according to the present embodiment will be mainly described with respect to differences from the first embodiment.

Figure 14:
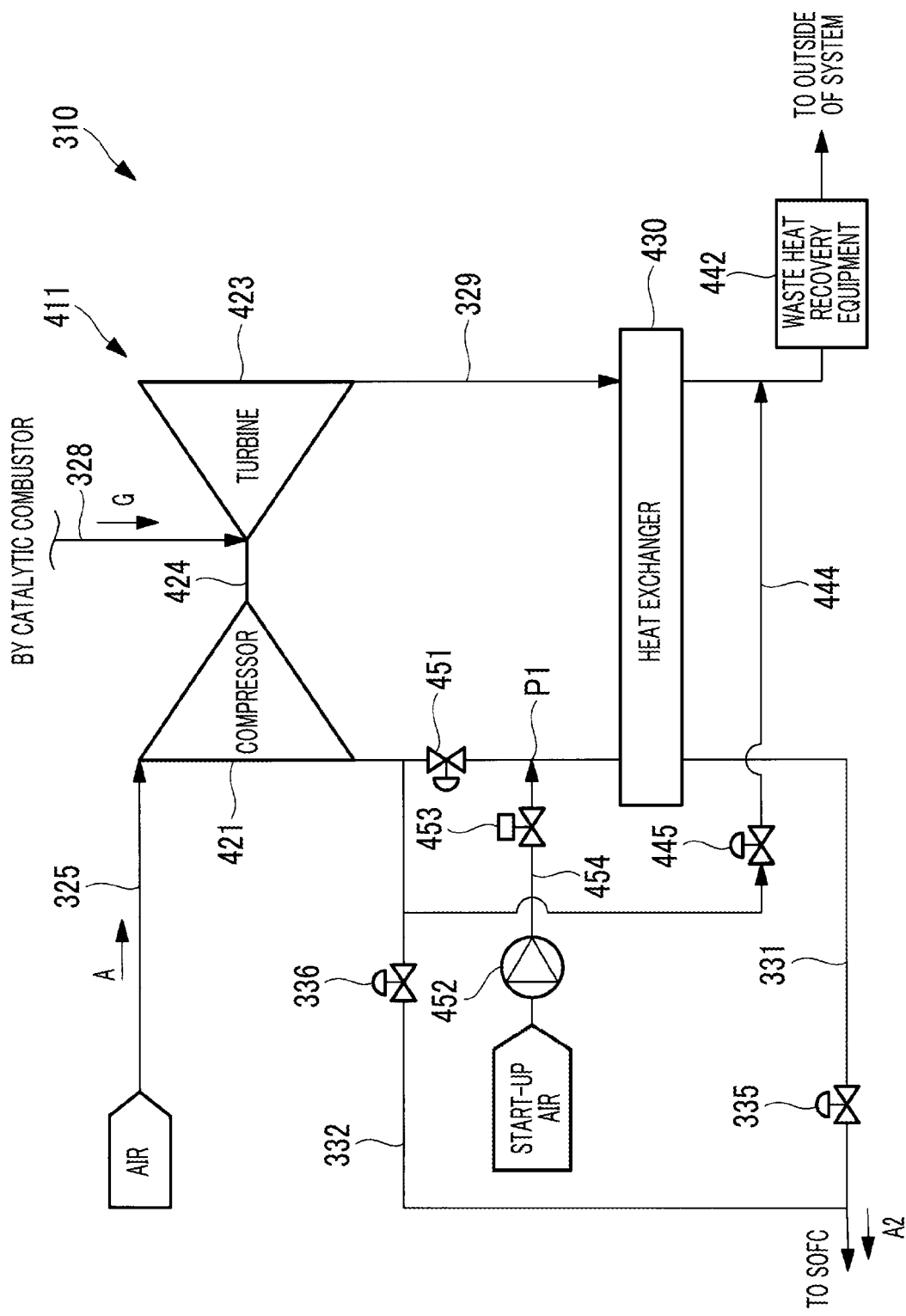
FIG. 14 shows a schematic configuration around the turbocharger of the fuel cell system according to second embodiment of the present disclosure.

As illustrated in FIG. 14, the fuel cell system 310 in the present embodiment has the same configuration as that in FIG. 4 in the first embodiment. FIG. 14 illustrates an excerpt of the configuration around the turbocharger 411, and other configurations are the same as those in FIG. 4. In the first embodiment, the blow valve 445 is started to be closed after the required condition for self-sustenance is satisfied, but in the present embodiment, the blow valve 445 is started to be closed earlier. Accordingly, energy loss is reduced.

Figure 15:
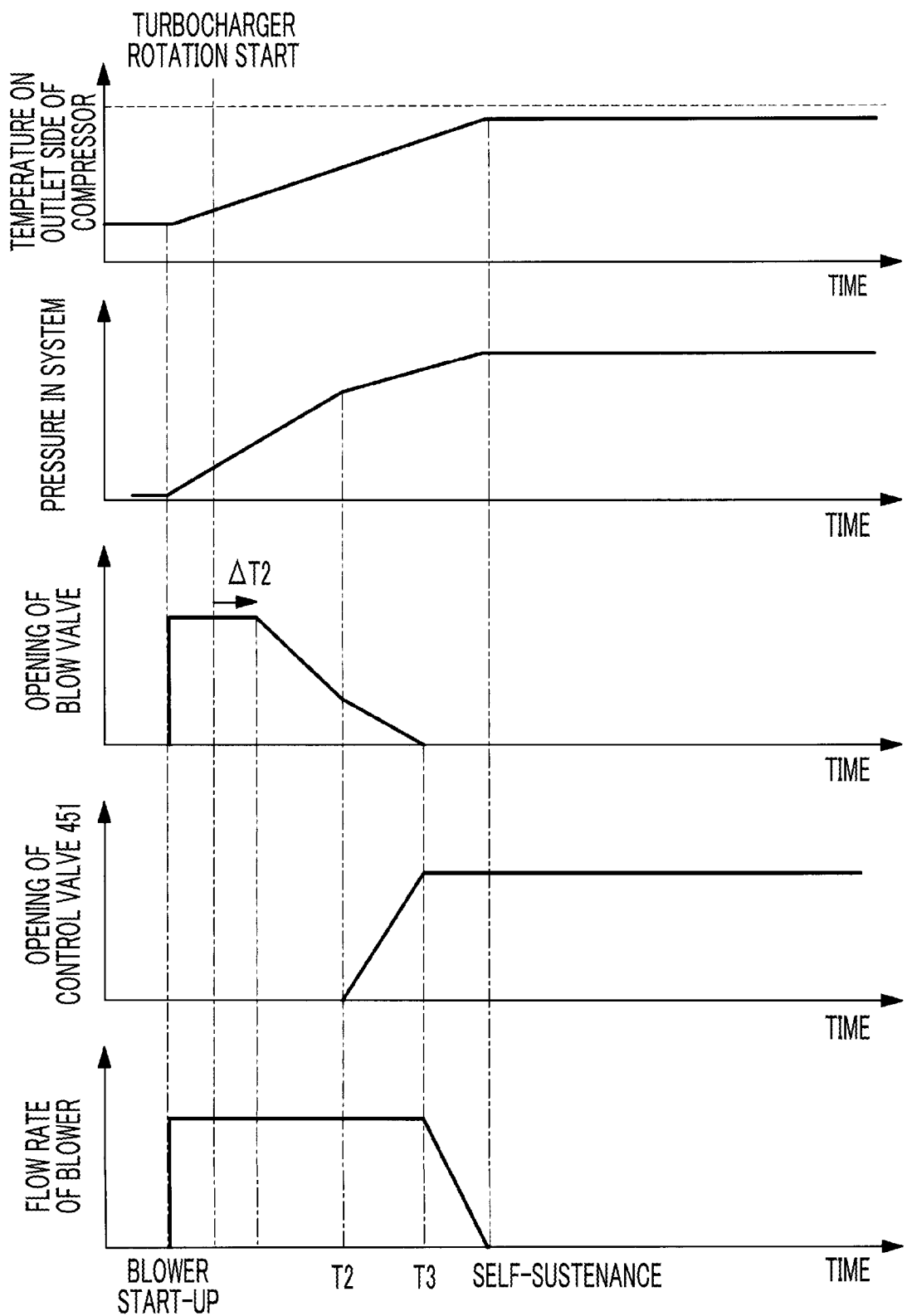
FIG. 15 shows example of a state transition in start-up according to the second embodiment of the present disclosure.

Specifically, the control unit 20 decreases the opening of the blow valve 445 after predetermined time elapses from the start of rotation of the turbocharger 411. As illustrated in FIG. 15, the rotation of the turbocharger 411 starts after the blower 452 is started. Therefore, the blow valve 445 starts to be closed after predetermined time ΔT2 has elapsed from the start of rotation of the turbocharger 411.

In other words, the control unit 20 starts to decrease the opening of the blow valve 445 before the timing (T2 in FIG. 15) when the pressure on the outlet side of the compressor 421 reaches the pressure of the connecting portion P1. Therefore, the predetermined time ΔT2 is set in advance as the time before the pressure on the outlet side of the compressor 421 reaches the pressure (that is, the pressure of the blower 452) of the connecting portion P1 after the turbocharger 411 starts rotating in the fuel cell system 310.

Then, in case where the pressure on the outlet side of the compressor 421 reaches predetermined set pressure PS that is equal to or higher than the pressure of the connecting portion P1, the opening of the control valve 451 starts to increase. Specifically, the control valve 451 starts to be opened at the timing (T2 in FIG. 15) when the pressure on the outlet side of the compressor 421 becomes the pressure PS equal to or higher than the pressure of the connecting portion P1. Then, control is performed to decrease the opening of the blow valve 445 and to increase the opening of the control valve 451 such that the pressure on the outlet side of the compressor 421 is equal to PS. Then, with the passage of time, the rotation speed of the turbocharger 411 increases, the blow valve 445 is fully closed, and the control valve 451 reaches predetermined opening (for example, the design flow rate opening) (T3 in FIG. 15). In this manner, in FIG. 15, cross control between the blow valve 445 and the control valve 451 is performed during the period from T2 to T3.

Then, the control unit 20 starts to decrease the supply amount of the start-up air at T3 when the blow valve 445 is fully closed, and finally stops the blower 452. Accordingly, the turbocharger 411 becomes self-sustaining.

In the present embodiment, the pressure on the outlet side of the compressor 421 is intentionally increased by closing the blow valve 445. Then, at the timing T2 when the pressure on the outlet side of the compressor 421 is equal to or higher than the pressure of the connecting portion P1, the blow valve 445 is continuously closed, and the control valve 451 is started to be opened to perform cross control and switch control. Therefore, the blow valve 445 can be started to be closed early, and the energy discharge amount of the oxidizing gas which flows through the oxidizing gas blow line 444 and which is discharged to the outside of the system can be suppressed.

As described above, according to the fuel cell system and the method for starting the same according to the present embodiment, by starting to decrease the opening of the blow valve 445 before the pressure on the outlet side of the compressor 421 reaches pressure of the connecting portion P1 of the start-up air line 454 and the oxidizing gas supply line 331, the energy loss is decreased because the discharge from the oxidizing gas blow line 444 to the outside of the system is reduced. By decreasing the opening of the blow valve 445, the pressure on the outlet side of the compressor 421 is increased, the opening of the control valve 451 starts to be increased in case where the pressure on the outlet side of the compressor 421 is equal to or higher than the pressure of the connecting portion P1, and accordingly, it is possible to perform the start-up earlier while suppressing the backward flow of the oxidizing gas. In case where the pressure on the outlet side of the compressor 421 is equal to or higher than the pressure of the connecting portion P1, by decreasing the opening of the blow valve 445 such that the pressure on the outlet side of the compressor 421 is equal to or higher than the pressure of the connecting portion P1, and by increasing the opening of the control valve 451, the backward flow of the oxidizing gas can be suppressed, and the start-up can be performed more stably.

Third Embodiment

Next, the fuel cell system and the method for starting the same according to third embodiment of the present disclosure will be described.

In the present embodiment, case where the start-up blowers are provided at different positions will be described. Hereinafter, the fuel cell system and the method for starting the fuel cell system according to the present embodiment will be mainly described with respect to differences from the first embodiment.

Figure 16:
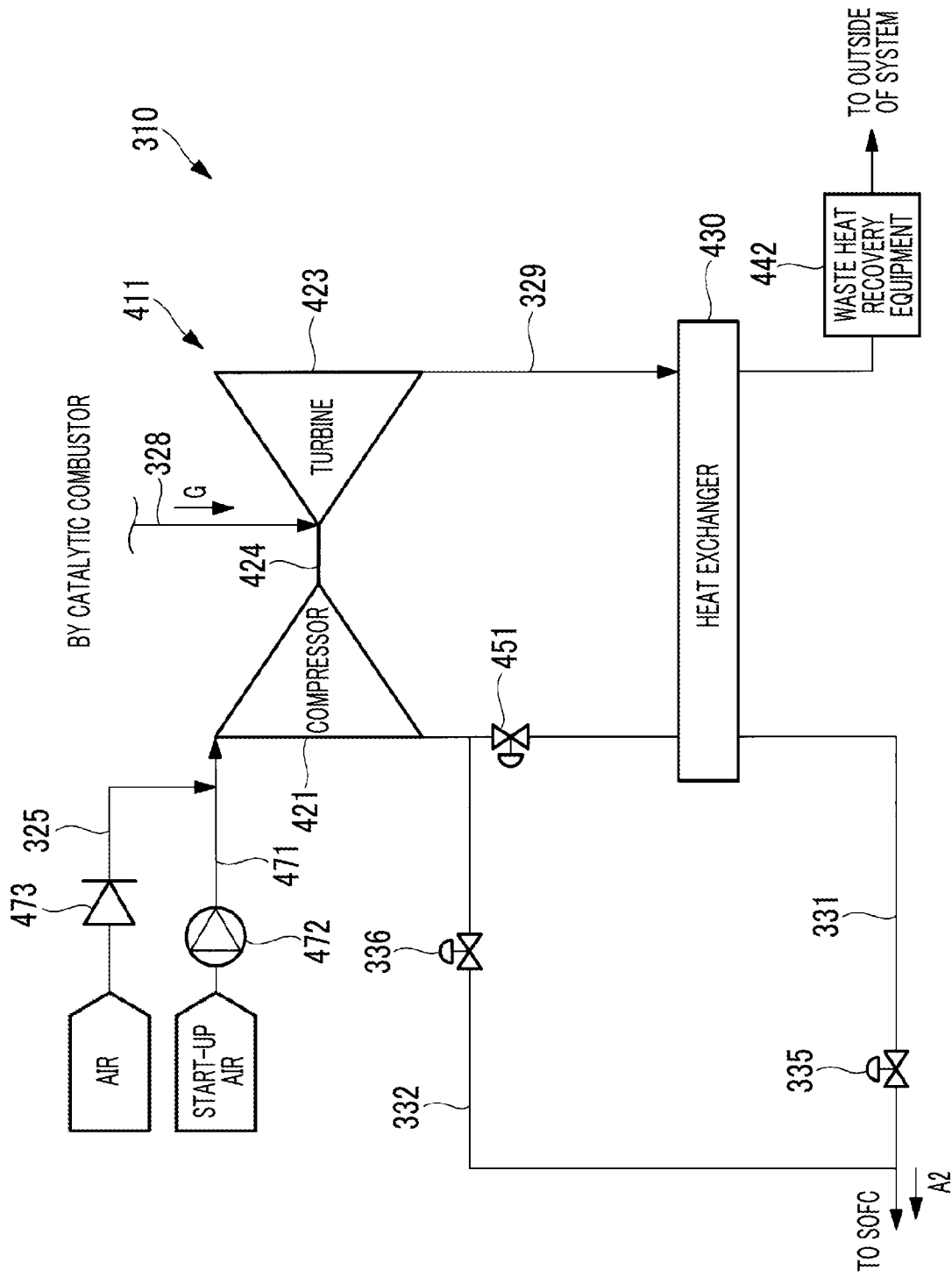
FIG. 16 shows a schematic configuration around the turbocharger of the fuel cell system according to third embodiment of the present disclosure.

The schematic configuration of the fuel cell system 310 in the present embodiment is illustrated in FIG. 16. FIG. 16 illustrates an excerpt of the configuration around the turbocharger 411, and other configurations are the same as those in FIG. 4. In other words, in the fuel cell system 310 of the present embodiment, a start-up blower 472 is provided in series on the upstream side of the compressor 421. Specifically, the start-up blower 472 is provided on line 471 on the upstream side of the compressor 421, and supplies the start-up oxidizing gas to the compressor 421.

The air intake line 325 is provided with a check valve 473. Accordingly, the start-up air is supplied to the compressor 421 by the start-up blower 472 at the time of start-up, the turbine 423 is rotationally driven to increase the rotation speed, and according to this, in case where the suction amount of the compressor 421 is insufficient, the ambient air is taken in from the air intake line 325. The check valve 473 prevents the start-up air boosted by the start-up blower 472 from flowing backward toward the air intake line 325.

Then, the control unit 20 flows the oxidizing gas to the oxidizing gas supply line 331 with the start-up blower 472 to start the turbocharger 411.

In the present embodiment, since the start-up air boosted by the start-up blower 472 is further compressed by the compressor 421, the temperature of the oxidizing gas flowing through the oxidizing gas supply line 331 is raised. Therefore, it is preferable that the control unit 20 stops the start-up blower 472 in case where the temperature on the outlet side of the compressor 421 is equal to or higher than predetermined temperature.

Figure 17:
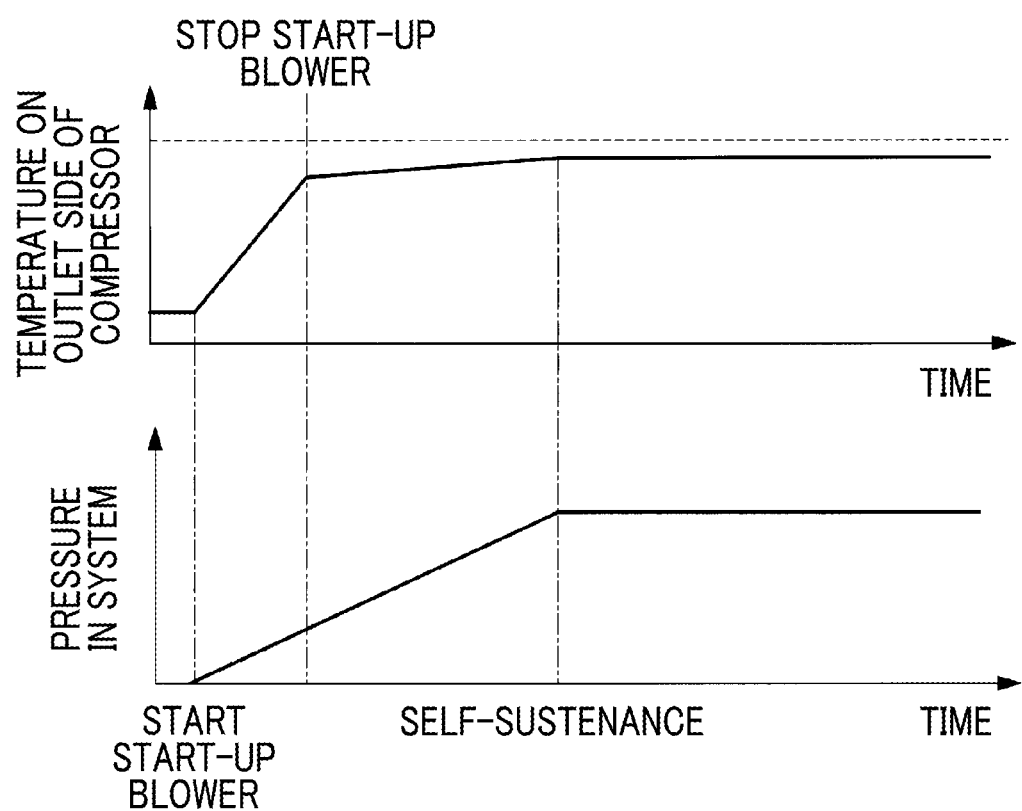
FIG. 17 shows example of a state transition in start-up according to the third embodiment of the present disclosure.

In other words, as illustrated in FIG. 17, when the start-up blower 472 is started, the pressure in the system and the temperature on the outlet side of the compressor 421 are raised, but in case where the temperature on the outlet side of the compressor 421 reaches predetermined temperature, the start-up blower 472 is stopped. Even in case where the start-up blower 472 is stopped, the oxidizing gas compressed by the compressor 421 is supplied to the oxidizing gas supply line 331, and flows in each system, and then the turbine 423 is rotationally driven via the catalytic combustor 422. Then, since the compressor 421 is rotationally driven by the rotation of the turbine 423, the pressure in the system is raised, and the turbocharger 411 can be made self-sustaining.

As described above, according to the fuel cell system and the method for starting the same according to the present embodiment, in the fuel cell system 310 in which the fuel cell and the turbocharger 411 are combined, the turbocharger 411 cannot be started independently unlike the gas turbine, for example, and thus, the turbocharger 411 is started by using the start-up air. In other words, the start-up blower 472 is provided in series with the compressor 421 on the upstream side or the downstream side, and the start-up blower 472 flows the oxidizing gas to the oxidizing gas supply line 331 to start the turbocharger 411. Accordingly, the oxidizing gas is released to the outside of the system while the pressure on the outlet side of the compressor 421 is monitored for start-up, and is released to the outside of the system by the blow valve 445 in case of decreasing the opening of the blow valve 445 and increasing the opening of the control valve 451. Therefore, compared to case where the blow valve 445 releases the gas to the outside of the system at the time of start-up, the energy loss can be suppressed, and the consumption amount of the fuel gas L1 supplied to the catalytic combustor 422 can be suppressed. Since the start-up blower 472 is provided on the upstream side of the compressor 421 and supplies the start-up oxidizing gas to the compressor 421, the oxidizing gas heated by the start-up blower 472 can be compressed by the compressor 421, and thus, the temperature can be raised more effectively. Boosting is performed by connecting in series with the compressor 421, and the power (required discharge pressure) of the start-up blower 472 can also be decreased.

In case where the temperature on the outlet side of the compressor 421 is equal to or higher than predetermined temperature, the start-up blower 472 is stopped, and accordingly, case where the temperature of the oxidizing gas is raised extremely high can be suppressed.

Fourth Embodiment

Next, the fuel cell system and the method for starting the same according to fourth embodiment of the present disclosure will be described.

Case where a start-up blower 474 is provided at a position different from that of the above-described third embodiment will be described. Hereinafter, the fuel cell system and the method for starting the same according to the present embodiment will be mainly described with respect to differences from the third embodiment.

Figure 18:
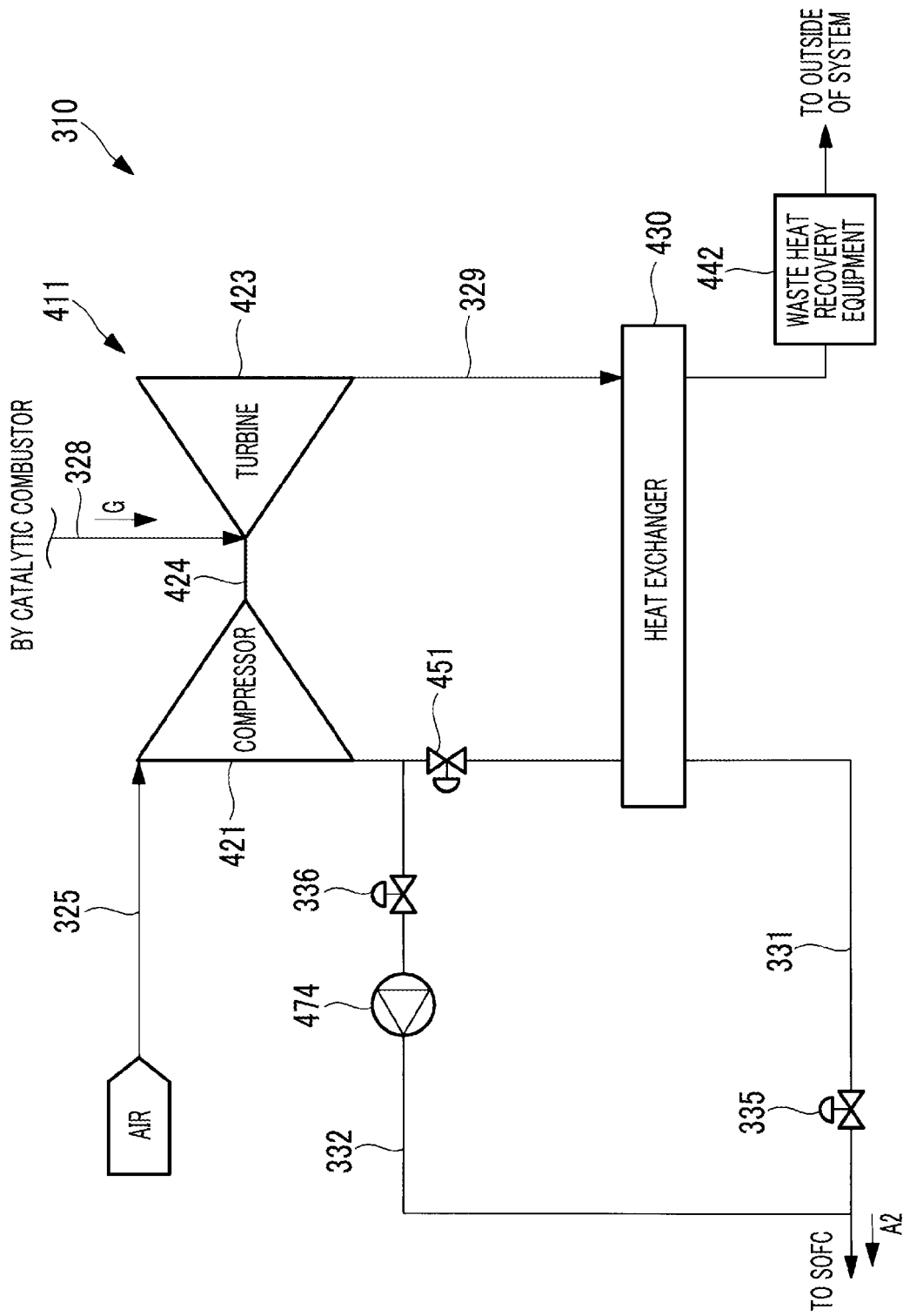
FIG. 18 shows a schematic configuration around the turbocharger of fuel cell system according to fourth embodiment of the present disclosure.

The schematic configuration of the fuel cell system 310 in the present embodiment is illustrated in FIG. 18. FIG. 18 illustrates an excerpt of the configuration around the turbocharger 411, and other configurations are the same as those in FIG. 4. As illustrated in FIG. 18, in the fuel cell system 310, the heat exchanger 430 that exchanges heat between the combustion gas discharged from the turbine 423 and the oxidizing gas of the oxidizing gas supply line 331; and the heat exchanger bypass line 332 connected to the oxidizing gas supply line 331 and bypassing the heat exchanger 430 are provided. In the fuel cell system 310, the start-up blower 474 is provided in series with the compressor 421 on the downstream side. Specifically, the start-up blower 474 is provided in the heat exchanger bypass line 332.

Then, the control unit 20 flows the oxidizing gas through the oxidizing gas supply line 331 with the start-up blower 474, the oxidizing gas flows in each system from the oxidizing gas supply line 331, and after this, the turbine 423 is rotationally driven via the catalytic combustor 422 to start the turbocharger 411.

Figure 19:
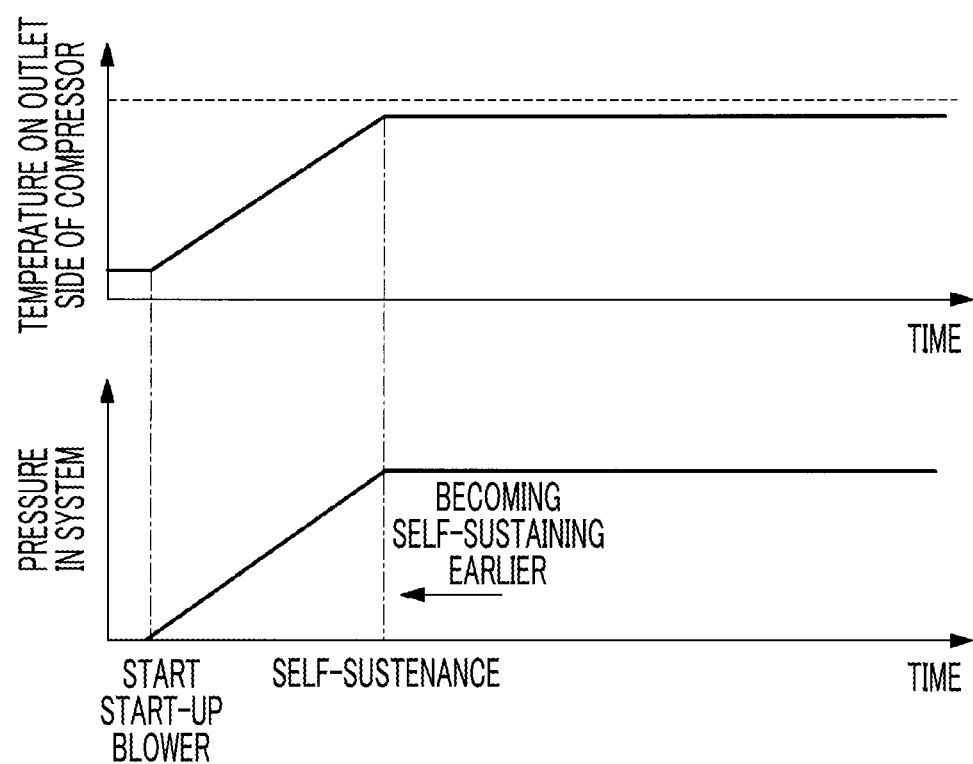
FIG. 19 shows example of a state transition in start-up according to the fourth embodiment of the present disclosure.

In other words, as illustrated in FIG. 19, when the start-up blower 474 is started, the pressure in the system and the temperature on the outlet side of the compressor 421 are raised, and the turbocharger 411 can be made self-sustaining. In FIG. 16 (third embodiment), since the start-up blower 474 is provided on the upstream side of the compressor 421, the temperature on the outlet side of the compressor 421 is further raised, and thus, there is a restriction on the operation of the start-up blower 474 due to the temperature on the outlet side. However, in the present embodiment, there is no restriction due to the temperature on the outlet side of the compressor 421. Since the oxidizing gas compressed by the compressor 421 can be boosted by the start-up blower 474, it can be expected that the turbocharger 411 becomes self-sustaining earlier. In the present embodiment, the start-up blower 474 needs to take measures for heat resistance and pressure resistance.

As described above, according to the fuel cell system and the method for starting the same according to the present embodiment, by providing the start-up blower 474 on the heat exchanger bypass line 332 that bypasses the heat exchanger 430, the start-up blower 474 can raise the temperature of the oxidizing gas compressed by the compressor 421, and thus, the temperature can be raised more effectively. The oxidizing gas is released to the outside of the system while the pressure on the outlet side of the compressor 421 is monitored for start-up, and is not released to the outside of the system by the blow valve 445 in case of decreasing the opening of the blow valve 445 and increasing the opening of the control valve 451. Therefore, energy loss can be suppressed, and the consumption amount of the fuel gas L1 supplied to the catalytic combustor 422 can be suppressed.

The present disclosure is not limited to the above-described embodiments, and can be appropriately modified without departing from the gist of the present invention. It is also possible to combine each embodiment. In other words, the above-described first embodiment, second embodiment, third embodiment, and fourth embodiment can also be combined with each other.

The fuel cell system and the method for starting the same described in each of the above-described embodiments are understood as follows, for example.

The fuel cell system (310) according to the present disclosure includes: fuel cell (313) having cathode (113) and anode (109); a turbocharger (411) having a turbine (423) in which exhaust fuel gas and exhaust oxidizing gas discharged from the fuel cell (313) are supplied as combustion gas and having a compressor (421) driven by the turbine (423); oxidizing gas supply line (331) for supplying the oxidizing gas compressed by the compressor (421) to the cathode (113); a control valve (451) provided in the oxidizing gas supply line (331); blow line (444) having one end connected to upstream side of the control valve (451) in the oxidizing gas supply line (331) and discharging the oxidizing gas to outside of the system with a blow valve (445); start-up air line (454) having one end connected to downstream side of the control valve (451) in the oxidizing gas supply line (331) and supplying start-up air to the oxidizing gas supply line (331) with a blower (452); and a control unit (20) that decreases opening of the blow valve (445), increases opening of the control valve (451) after the opening of the blow valve (445) starts to be decreased, and then stops the supply of the start-up air in state where the control valve (451) is closed and the blow valve (445) is opened to supply the start-up air to the oxidizing gas supply line (331) with the blower (452) in case where start-up of the turbocharger (411) is performed.

According to the fuel cell system (310) according to the present disclosure, in the fuel cell system (310) in which the fuel cell (313) and the turbocharger (411) are combined, the turbocharger (411) cannot be started independently unlike the gas turbine (423), for example, and thus the turbocharger (411) is started by using the start-up air supplied from the start-up air line (454). Then, by using the control valve (451) provided on the oxidizing gas supply line (331) and the blow valve (445) provided on the blow line (444) that discharges the oxidizing gas to the outside of the system, the oxidizing gas flowing through the oxidizing gas supply line (331) is switched to the oxidizing gas compressed by the compressor (421) from the start-up air. Specifically, from the state where the control valve (451) is closed and the blow valve (445) is opened to supply the start-up air to the oxidizing gas supply line (331) with the blower (452) (that is, state where the start-up air is flowing), by opening the control valve (451) (cross control) while decreasing the opening of the blow valve (445), switching to the oxidizing gas compressed by the compressor (421) is performed. When switching is performed in this manner, the opening of the control valve (451) is increased after the timing at which the opening of the blow valve (445) is started to be decreased, and accordingly, by providing a time difference at the start of the operation of the blow valve (445) and the control valve (451), the backward flow of the oxidizing gas can be suppressed more effectively. In other words, since the control valve (451) is opened in state where the opening of the blow valve (445) is decreased and the pressure on the upstream side (outlet side of the compressor (421)) of the control valve (451) is increased, the switching can be performed more stably. As a result, even in case where the fuel cell (313) and the turbocharger (411) are combined, it is possible to start the engine more stably.

In the fuel cell system (310) according to the present disclosure, the control unit (20) may decrease the opening of the blow valve (445) in case where a rotation speed of the turbocharger (411) is equal to or higher than predetermined value or the temperature of combustion gas supplied to the turbine (423) is equal to or higher than predetermined temperature.

According to the fuel cell system (310) according to the present disclosure, in case where the rotation speed of the turbocharger (411) is equal to or higher than predetermined value and the temperature of the combustion gas supplied to the turbine (423) is equal to or higher than predetermined temperature, by decreasing the opening of the blow valve (445), the backward flow of the oxidizing gas can be suppressed more stably.

In the fuel cell system (310) according to the present disclosure, the control unit (20) may increase the opening of the control valve (451) after predetermined time elapses from the timing at which the opening of the blow valve (445) starts to be decreased.

According to the fuel cell system (310) according to the present disclosure, by increasing the opening of the control valve (451) after predetermined time elapses from the timing when the opening of the blow valve (445) starts to be decreased, it is possible to more effectively suppress the backward flow of the oxidizing gas.

In the fuel cell system (310) according to the present disclosure, the control unit (20) may decrease the opening of the blow valve (445) after predetermined time elapses from the start of rotation of the turbocharger (411).

According to the fuel cell system (310) according to the present disclosure, by decreasing the opening of the blow valve (445) after predetermined time elapses from the start of rotation of the turbocharger (411), energy loss is decreased because the discharge from the blow line (444) to the outside of the system is decreased after predetermined time elapses.

In the fuel cell system (310) according to the present disclosure, the control unit (20) may start to decrease the opening of the blow valve (445) before the pressure on outlet side of the compressor (421) reaches the pressure at connecting portion (P1) between the start-up air line (454) and the oxidizing gas supply line (331), and may start to increase the opening of the control valve (451) in case where the pressure on the outlet side of the compressor (421) is equal to or higher than the pressure at the connecting portion (P1).

According to the fuel cell system (310) according to the present disclosure, by starting to decrease the opening of the blow valve (445) before the pressure on the outlet side of the compressor (421) reaches pressure of the connecting portion (P1) of the start-up air line (454) and the oxidizing gas supply line (331), the energy loss is decreased because the discharge from the blow line (444) to the outside of the system is reduced. By decreasing the opening of the blow valve (445), the pressure on the outlet side of the compressor (421) is increased, the opening of the control valve (451) starts to be increased in case where the pressure on the outlet side of the compressor (421) is equal to or higher than the pressure of the connecting portion (P1), and accordingly, it is possible to perform the start-up earlier while suppressing the backward flow of the oxidizing gas.

In the fuel cell system (310) according to the present disclosure, the control unit (20) may decrease the opening of the blow valve (445) and increase the opening of the control valve (451) such that state where the pressure on the outlet side of the compressor (421) is equal to or higher than the pressure at the connecting portion (P1) continues, in case where the pressure on the outlet side of the compressor (421) is equal to or higher than the pressure at the connecting portion (P1).

According to the fuel cell system (310) according to the present disclosure, in case where the pressure on the outlet side of the compressor (421) is equal to or higher than the pressure of the connecting portion (P1), by decreasing the opening of the blow valve (445) such that state where the pressure on the outlet side of the compressor (421) is equal to or higher than the pressure of the connecting portion (P1) continues, and by increasing the opening of the control valve (451), the backward flow of the oxidizing gas can be suppressed, and the start-up can be performed more stably.

In the fuel cell system (310) according to the present disclosure, the control unit (20) may reduce the supply amount of the start-up air in case where the blow valve (445) is fully closed.

According to the fuel cell system (310) according to the present disclosure, in case where the blow valve (445) is fully closed, by reducing the supply amount of the start-up air, the switching from the start-up air to the oxidizing gas compressed by the compressor (421) can be completed earlier.

Fuel cell system (310) according to the present disclosure includes: fuel cell (313) having cathode (113) and anode (109); a turbocharger (411) having a turbine (423) in which exhaust fuel gas and exhaust oxidizing gas discharged from the fuel cell (313) are supplied as combustion gas and having a compressor (421) driven by the turbine (423); oxidizing gas supply line (331) for supplying the oxidizing gas compressed by the compressor (421) to the cathode (113); a start-up blower (472, 474) provided on upstream side or downstream side with respect to flow of the oxidizing gas of the compressor (421); and a control unit (20) that flows the oxidizing gas through the oxidizing gas supply line (331) with the start-up blower (472, 474) to rotate the compressor (421).

According to the fuel cell system (310) according to the present disclosure, in the fuel cell system (310) in which the fuel cell (313) and the turbocharger (411) are combined, the turbocharger (411) cannot be started independently unlike the gas turbine (423), for example, and thus, the turbocharger (411) is started by using the start-up air. In other words, the start-up blower (472, 474) is provided in series with the compressor (421) on the upstream side or the downstream side, and the start-up blower (472, 474) flows the oxidizing gas to the oxidizing gas supply line (331) to start the turbocharger (411). Accordingly, compared to case of releasing the oxidizing gas to the outside of the system at the time of start-up, the energy loss can be suppressed, and the consumption amount of the fuel gas (L1) supplied to the catalytic combustor (422) can be suppressed.

In the fuel cell system (310) according to the present disclosure, the start-up blower (472) may be provided on the upstream side of the compressor (421) and may supply the oxidizing gas to the compressor (421).

According to the fuel cell system (310) according to the present disclosure, the start-up blower (472) is provided on the upstream side of the compressor (421), and in order to supply the start-up oxidizing gas to the compressor (421), the oxidizing gas of which the temperature is raised by the start-up blower (472) can be compressed by the compressor (421), and thus, the temperature can be raised more effectively. Boosting is performed by connecting in series with the compressor (421), and the power (required discharge pressure) of the start-up blower (472) can also be decreased.

In the fuel cell system (310) according to the present disclosure, the control unit (20) may stop the start-up blower (472) in case where temperature on outlet side of the compressor (421) is equal to or higher than predetermined temperature.

According to the fuel cell system (310) according to the present disclosure, in case where the temperature on the outlet side of the compressor (421) is equal to or higher than predetermined temperature, the start-up blower (474) is stopped, and accordingly, case where the temperature of the oxidizing gas is raised extremely high can be suppressed.

The fuel cell system (310) according to the present disclosure may include: a heat exchanger (430) that exchanges heat between the combustion gas discharged from the turbine (423) and the oxidizing gas of the oxidizing gas supply line (331); and bypass line (332) connected to the oxidizing gas supply line (331) and bypassing the heat exchanger (430), and the start-up blower (474) may be provided on the bypass line (332).

According to the fuel cell system (310) according to the present disclosure, by providing the start-up blower (474) on the heat exchanger bypass line (332) that bypasses the heat exchanger (430), the start-up blower (474) can raise the temperature of the oxidizing gas compressed by the compressor (421), and thus, the temperature can be raised more effectively.

In the fuel cell system (310) according to the present disclosure, after the turbocharger becomes self-sustaining, the control unit (20) may supply the air heated by a start-up heater (458) to the fuel cell to raise the temperature until the temperature of the oxidizing gas supplied to the cathode or the temperature of a power generation chamber of the fuel cell reaches specified temperature.

According to the fuel cell system (310) according to the present disclosure, the temperature can be effectively raised after the turbocharger becomes self-sustaining.

Method for starting the fuel cell system (310) according to the present disclosure is method for starting the fuel cell system (310) including fuel cell (313) having cathode (113) and anode (109), a turbocharger (411) having a turbine (423) to which exhaust fuel gas and exhaust oxidizing gas discharged from the fuel cell (313) are supplied as combustion gas and having a compressor (421) driven by the turbine (423), oxidizing gas supply line (331) for supplying oxidizing gas compressed by the compressor (421) to the cathode (113), a control valve (451) provided in the oxidizing gas supply line (331), blow line (444) having one end connected to upstream side of the control valve (451) in the oxidizing gas supply line (331) and discharging the oxidizing gas to outside of the system with a blow valve (445), and start-up air line (454) having one end connected to downstream side of the control valve (451) in the oxidizing gas supply line (331) and supplying start-up air to the oxidizing gas supply line (331) with a blower (452), the method including: decreasing opening of the blow valve (445), increasing opening of the control valve (451) after a timing at which the opening of the blow valve (445) starts to be decreased, and then stopping the supply of the start-up air in state where the control valve (451) is closed and the blow valve (445) is opened to supply the start-up air to the oxidizing gas supply line (331) with the blower (452) in case where start-up of the turbocharger (411) is performed.

Method for starting the fuel cell system (310) according to the present disclosure is method for starting the fuel cell system (310) including fuel cell (313) having cathode (113) and anode (109), a turbocharger (411) having a turbine (423) to which exhaust fuel gas and exhaust oxidizing gas discharged from the fuel cell (313) are supplied as combustion gas and having a compressor (421) driven by the turbine (423), oxidizing gas supply line (331) for supplying oxidizing gas compressed by the compressor (421) to the cathode (113), and a start-up blower (472, 474) provided on upstream side or downstream side with respect to flow of the oxidizing gas of the compressor (421), the method including: flowing the oxidizing gas through the oxidizing gas supply line (331) with the start-up blower (472, 474) to rotate the compressor (421).

REFERENCE SIGNS LIST

- 11: CPU
- 12: ROM
- 13: RAM
- 14: hard disk drive
- 15: communication unit
- 18: bus
- 20: control unit
- 101: cell stack
- 103: substrate tube
- 105: fuel cell
- 107: interconnector
- 109: anode (fuel electrode)
- 111: solid electrolyte film
- 113: cathode (air electrode)
- 115: lead film
- 201: SOFC module
- 203: SOFC cartridge
- 205: pressure vessel
- 207: fuel gas supply pipe
- 207a: fuel gas supply branch pipe
- 209: fuel gas discharge pipe
- 209a: fuel gas discharge branch pipe
- 215: power generation chamber
- 217: fuel gas supply header
- 219: fuel gas discharge header
- 221: oxidizing gas supply header
- 223: oxidizing gas discharge header
- 225a: upper tube plate
- 225b: lower tube plate
- 227a: upper thermal insulation
- 227b: lower thermal insulation
- 229a: upper casing
- 229b: lower casing
- 231a: fuel gas supply hole
- 231b: fuel gas discharging hole
- 233a: oxidizing gas supply hole
- 233b: oxidizing gas discharging hole
- 235a: oxidizing gas supply gap
- 235b: oxidizing gas discharge gap
- 237a: seal member
- 237b: seal member
- 310: fuel cell system
- 313: SOFC (fuel cell)
- 325: air intake line
- 328: combustion gas supply line
- 329: combustion exhaust gas line
- 331: oxidizing gas supply line
- 332: heat exchanger bypass line
- 333: exhaust oxidizing gas line
- 335: control valve
- 336: control valve
- 341: fuel gas line
- 342: control valve
- 343: exhaust fuel gas line
- 346: shutoff valve
- 347: regulating valve
- 348: recycling blower
- 349: fuel gas recycling line
- 350: exhaust fuel gas release line
- 351: exhaust air cooler
- 352: control valve
- 361: purified water supply line
- 362: pump
- 411: turbocharger
- 421: compressor
- 422: catalytic combustor
- 423: turbine
- 424: rotary shaft
- 430: heat exchanger
- 441: orifice
- 442: waste heat recovery equipment
- 443: control valve
- 444: oxidizing gas blow line
- 445: blow valve
- 451: control valve
- 452: blower
- 453: control valve
- 454: start-up air line
- 455: start-up air heating line
- 456: control valve
- 457: control valve
- 458: start-up heater
- 459: control valve 460: control valve
471: line
472: start-up blower
473: check valve
474: start-up blower

The invention claimed is:

1. Fuel cell system comprising:
fuel cell having cathode and anode;
a turbocharger having a turbine to which exhaust fuel gas and exhaust oxidizing gas discharged from the fuel cell are supplied as combustion gas and having a compressor driven by the turbine;
oxidizing gas supply line for supplying oxidizing gas compressed by the compressor to the cathode;
a control valve provided in the oxidizing gas supply line;
blow line having one end connected to upstream side of the control valve in the oxidizing gas supply line and discharging the oxidizing gas to outside of the system with a blow valve;
start-up air line having one end connected to downstream side of the control valve in the oxidizing gas supply line and supplying start-up air to the oxidizing gas supply line with a blower; and
a control unit that decreases opening of the blow valve, increases opening of the control valve after the opening of the blow valve starts to be decreased, and then stops the supply of the start-up air in state where the control valve is closed and the blow valve is opened to supply the start-up air to the oxidizing gas supply line with the blower in case where start-up of the turbocharger is performed.

2. The fuel cell system according to claim 1, wherein the control unit decreases the opening of the blow valve in case where a rotation speed of the turbocharger is equal to or higher than predetermined value or temperature of combustion gas supplied to the turbine is equal to or higher than predetermined temperature.

3. The fuel cell system according to claim 1, wherein the control unit increases the opening of the control valve after predetermined time elapses from the timing at which the opening of the blow valve starts to be decreased.

4. The fuel cell system according to claim 1, wherein the control unit decreases the opening of the blow valve after predetermined time elapses from start of rotation of the turbocharger.

5. The fuel cell system according to claim 1, wherein the control unit starts to decrease the opening of the blow valve before the pressure on outlet side of the compressor reaches the pressure at connecting portion between the start-up air line and the oxidizing gas supply line, and starts to increase the opening of the control valve in case where the pressure on the outlet side of the compressor is equal to or higher than the pressure at the connecting portion.

6. The fuel cell system according to claim 5, wherein the control unit decreases the opening of the blow valve and increases the opening of the control valve such that state where the pressure on the outlet side of the compressor is equal to or higher than the pressure at the connecting portion continues, in case where the pressure on the outlet side of the compressor is equal to or higher than the pressure at the connecting portion.

7. The fuel cell system according to claim 6, wherein the control unit reduces a supply amount of the start-up air in case where the blow valve is fully closed.

8. Fuel cell system comprising:
fuel cell having cathode and anode;
a turbocharger having a turbine to which exhaust fuel gas and exhaust oxidizing gas discharged from the fuel cell are supplied as combustion gas and having a compressor driven by the turbine;
oxidizing gas supply line for supplying oxidizing gas compressed by the compressor to the cathode;
a start-up blower provided on upstream side or downstream side with respect to flow of the oxidizing gas of the compressor;
a control unit that flows the oxidizing gas through the oxidizing gas supply line with the start-up blower to rotate the compressor;
a heat exchanger that exchanges heat between combustion gas discharged from the turbine and the oxidizing gas of the oxidizing gas supply line; and
bypass line connected to the oxidizing gas supply line and bypassing the heat exchanger.

9. The fuel cell system according to claim 8, wherein the start-up blower is provided on the upstream side of the compressor and supplies the oxidizing gas to the compressor.

10. The fuel cell system according to claim 8, wherein-the start-up blower is provided on the bypass line.

11. The fuel cell system according to claim 10, wherein the control unit stops the start-up blower in case where temperature on outlet side of the compressor is equal to or higher than predetermined temperature.

12. The fuel cell system according to claim 1, wherein after the turbocharger becomes self-sustaining, the control unit supplies air heated by a start-up heater to the fuel cell to raise temperature until temperature of the oxidizing gas supplied to the cathode or temperature of a power generation chamber of the fuel cell reaches specified temperature.

13. Method for starting fuel cell system including fuel cell having cathode and anode, a turbocharger having a turbine to which exhaust fuel gas and exhaust oxidizing gas discharged from the fuel cell are supplied as combustion gas and having a compressor driven by the turbine, oxidizing gas supply line for supplying oxidizing gas compressed by the compressor to the cathode, a control valve provided in the oxidizing gas supply line, blow line having one end connected to upstream side of the control valve in the oxidizing gas supply line and discharging the oxidizing gas to outside of the system with a blow valve, and start-up air line having one end connected to downstream side of the control valve in the oxidizing gas supply line and supplying start-up air to the oxidizing gas supply line with a blower, the method comprising:
decreasing opening of the blow valve, increasing opening of the control valve after a timing at which the opening of the blow valve starts to be decreased, and then stopping the supply of the start-up air in state where the control valve is closed and the blow valve is opened to supply the start-up air to the oxidizing gas supply line with the blower in case where start-up of the turbocharger is performed.

14. Method for starting fuel cell system including fuel cell having cathode and anode, a turbocharger having a turbine to which exhaust fuel gas and exhaust oxidizing gas discharged from the fuel cell are supplied as combustion gas and having a compressor driven by the turbine, oxidizing gas supply line for supplying oxidizing gas compressed by the compressor to the cathode, a start-up blower provided on upstream side or downstream side with respect to flow of the oxidizing gas of the compressor, a heat exchanger that exchanges heat between combustion gas discharged from the turbine and the oxidizing gas of the oxidizing gas supply line, and bypass line connected to the oxidizing gas supply line and bypassing the heat exchanger, the method comprising:

flowing the oxidizing gas through the oxidizing gas supply line with the start-up blower to rotate the compressor.

* * * * *